(12) United States Patent
Tanaka

(10) Patent No.: US 6,418,274 B2
(45) Date of Patent: Jul. 9, 2002

(54) MOTOR CONTROL APPARATUS AND MOTOR CONTROL METHOD

(75) Inventor: Hirotomo Tanaka, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/742,107

(22) Filed: Dec. 22, 2000

(30) Foreign Application Priority Data

Dec. 24, 1999 (JP) ........................................ 1999-368029
Feb. 9, 2000 (JP) ........................................ 2000-032045

(51) Int. Cl.$^7$ ............................................... H02P 5/00
(52) U.S. Cl. ........................ 388/800; 318/600; 318/602
(58) Field of Search ................................ 388/800, 804, 388/912, 811; 318/600, 601, 602

(56) References Cited

U.S. PATENT DOCUMENTS

| | | | |
|---|---|---|---|
| 4,216,415 A | | 8/1980 | Shimonou et al. .......... 318/600 |
| 5,433,541 A | * | 7/1995 | Heida et al. ................ 400/279 |
| 5,444,340 A | * | 8/1995 | Tamaki et al. .............. 318/139 |
| 5,557,184 A | * | 9/1996 | Hwang ........................ 318/608 |
| 5,926,192 A | | 7/1999 | Yamane ........................ 347/10 |
| 5,932,985 A | * | 8/1999 | Hayashi ...................... 318/560 |
| 5,982,134 A | * | 11/1999 | Tanaka ........................ 318/696 |
| 6,081,091 A | * | 6/2000 | Mitchell et al. ............ 318/685 |
| 6,302,514 B1 | * | 10/2001 | Eade et al. ................... 347/33 |

FOREIGN PATENT DOCUMENTS

| | | |
|---|---|---|
| EP | 0 465 850 A2 | 1/1992 |
| EP | 0 680 829 A2 | 11/1995 |
| EP | 0945 277 A2 | 9/1999 |

OTHER PUBLICATIONS

European Search Report.

* cited by examiner

Primary Examiner—Robert E. Nappi
Assistant Examiner—Rina I. Duda
(74) Attorney, Agent, or Firm—Sughrue Mion, PLLC

(57) ABSTRACT

A motor control apparatus and a method according to the invention are directed to detecting a motor velocity. Leading and trailing edges of two pulse signals are distinctively detected from one another, and those pulse signals have cycles which are proportional to the motor velocity, and a phase difference between the pulse signals is about one quarter of a single cycle from one another. Then, a period of time between the pulse edges in the same direction of the same pulse signal is measured, and the period of time between the pulse edges is used to sequentially convert it into the motor velocity and thereby detect the motor velocity.

The motor control apparatus has a reverse rotation detector 6q detecting if, upon actuation by the motor 1, reverse rotations are caused in an attachment unit 65 where an encoder 13 is attached, from output pulses from the encoder rotated by rotations of the motor, a first pulse counter 6r counting edges of the output pulses from the encoder after the attachment unit has rotated from a reverse direction to a normal direction when the reverse rotations are caused in the attachment unit, to give a start command when a count value reaches a first specified value, and a speed calculator 6d receiving the start command when the reverse rotations are caused in the attachment unit, to compute the motor velocity from the output pulses from the encoder.

38 Claims, 20 Drawing Sheets

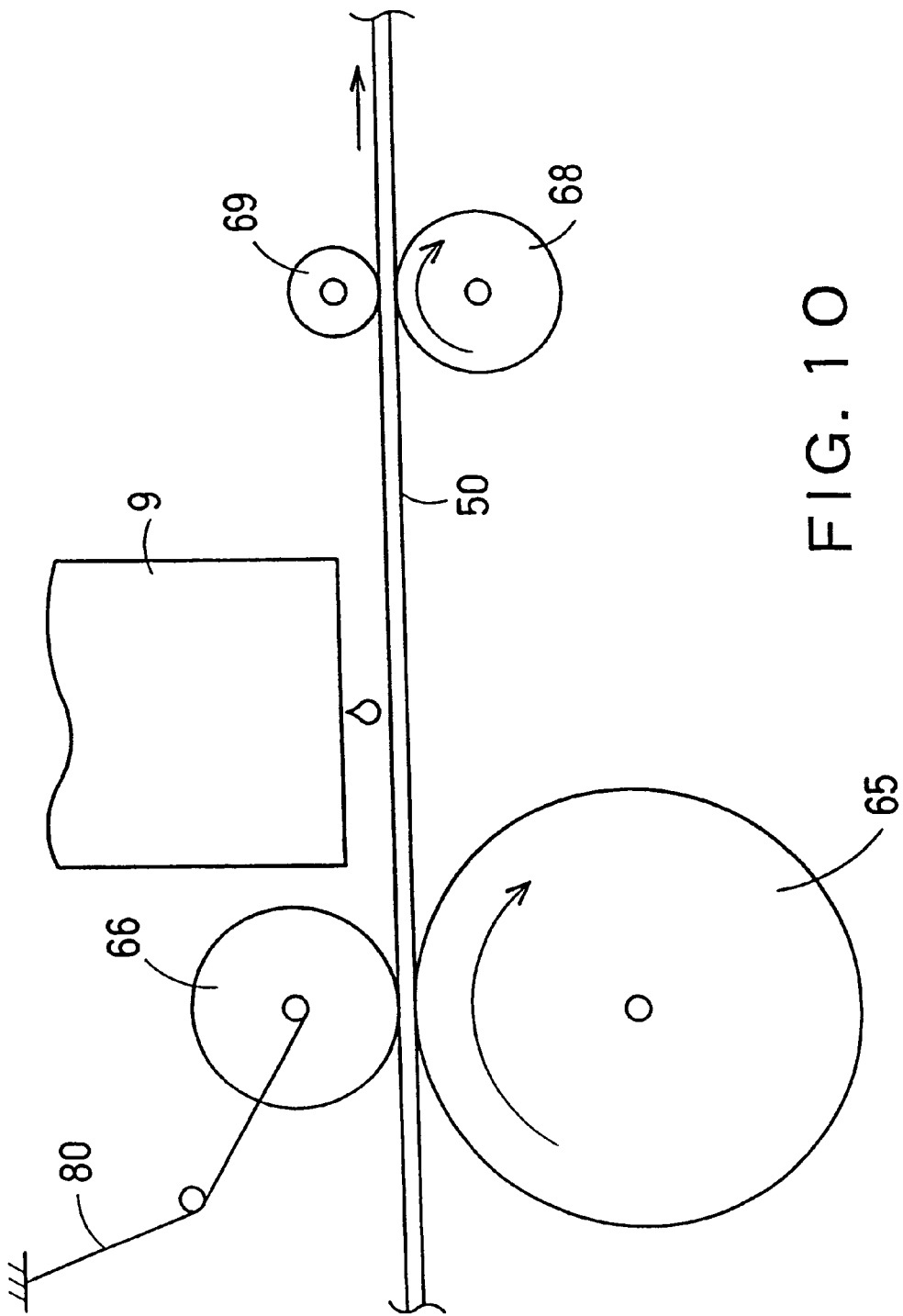

MOTOR CONTROL APPARATUS AND MOTOR CONTROL METHOD

BACKGROUND OF THE INVENTION

1. Field of the Invention

This invention relates to a motor control apparatus and a motor control method, and particularly, to a motor control apparatus and motor control method of controlling a motor by selectively employing timings of the rising and falling of pulse signals from an encoder which are used in serial printer to control a carriage motor driving a carriage or a paper feeding motor practicing a sheet feeding task, so as to detect a motor velocity. The present invention is also directed to a record medium that stores computer programs to execute such a motor control method.

2. Related Background Art

First explained is general configuration of an ink jet printer using a motor control device and its control method.

FIG. 1 is a block diagram that shows general configuration of an ink jet printer.

The ink jet printer shown in FIG. 1 includes a paper feed motor (hereinafter also called a PF motor) 1 that feeds paper; a paper feed motor driver 2 that drives the paper feed motor 1; a carriage 3 that supports a head 9 fixed thereto to supply ink onto printing paper 50 and is driven to move in parallel to the printing paper 50 and vertically of the paper feeding direction; a carriage motor (hereinafter also called a CR motor) 4 that drives the carriage 3; a CR motor driver 5 that drives the carriage motor 4; a DC unit 6 that outputs a D.C. current for controlling the CR motor driver 5; a pump motor 7 that controls the draft of ink for the purpose of preventing clogging of the head 9; a pump motor driver 8 that drives the pump motor 7; a head driver 10 that drives and controls the head 9; a linear encoder 11 fixed to the carriage 3; a linear encoder coding plate 12 having slits in predetermined intervals; a rotary encoder 13 for the PF motor 1; a paper detecting sensor 15 that detects the terminal position of each sheet of paper under printing; a CPU 16 that controls the whole printer; a timer IC 17 that periodically generates interruption signals to the CPU 16; an interface portion (hereinafter also called IF) 19 that exchanges data with a host computer 18; an ASIC 20 that controls the character resolution, driving waveform of the head 9, and so on, in accordance with character information sent from the host computer 18 through the IF 19; a PROM 21, a RAM 22 and an EEPROM 23 that are used as an operation area of the ASIC 20 and the CPU 16 and a program storage area; a platen 25 that supports the printing paper 50; a transport roller 27 driven by the PF motor 1 to transport the printing paper 50; a pulley 30 attached to a rotating shaft of the CR motor 4; and a timing belt 31 driven by the pulley 30.

The DC unit 6 controls and drives the paper feed motor driver 2 and the CR motor driver 5 in response to a control instruction sent from the CPU 16 and outputs of the encoders 11, 13. Both the paper feed motor 1 and the CR motor 4 are DC motors.

FIG. 2 is a perspective view that illustrates configuration around the carriage 3 of the ink jet printer.

As shown in FIG. 2, the carriage 3 is connected to the carriage motor 4 by the timing belt 31 via the pulley 30, and driven to move in parallel with the platen 25 under guidance of a guide member 32. The carriage 3 has the recording head 9 projecting from its surface opposed to the printing paper and having a row of nozzles for releasing black ink and a row of nozzles for releasing color ink. These nozzles are supplied with ink from the ink cartridge 34 and release drops of ink onto the printing paper to print characters and images.

In a non-print area of the carriage 3, there is provided a capping device 35 for shutting nozzle openings of the recording head 9 when printing is not executed, and a pump unit 36 having the pump motor 7 shown in FIG. 1. When the carriage 3 moves from the print area to the non-print area, it contacts a lever, not shown, and the capping device 35 moves upward to close the head 9.

When any of the nozzle openings of the head 9 is clogged, or ink is forcibly released from the head 9 just after replacement of the cartridge 34, the pump unit 36 is activated while closing the head 9, and a negative pressure from the pump unit 36 is used to suck out ink from the nozzle openings. As a result, dust and paper powder are washed out from around the nozzle openings, and bubbles in the head 9, if any, are discharged together with the ink to the cap 37.

FIG. 3 is a diagram schematically illustrating configuration of the linear encoder 11 attached to the carriage 3.

The encode 11 shown in FIG. 3 includes a light emitting diode 11a, collimator lens 11b and detector/processor 11c. The detector/processor 11c has a plurality of (four) photo diodes 11d, signal processing circuit 11e, and two comparators $11_{fA}$, $11_{fB}$.

When a voltage $V_{CC}$ is applied across opposite ends of the light emitting diode 11a through a resistor, light is emitted from the light emitting diode 11a. This light is collimated into parallel beams by the collimator lens 11b, and the beams pass through the coding plate 12. The coding plate 12 has slits in predetermined intervals (for example, in intervals of $\frac{1}{180}$ inch).

Parallel beams passing through the coding plate 12 enter into photo diodes 11d through fixed slits, not shown, and are converted into electric signals. Electric signals output from these four photo diodes 11d are processes in the signal processing circuit 11e. Signals output from the signal processing circuit 11e are compared in the comparators $11_{fA}$, $11_{fB}$, and comparison results are output as pulses. Pulses ENC-A, ENC-B output from the comparators $11_{fA}$, $11_{fB}$ are outputs of the encoder 11.

FIGS. 4A and 4B are timing charts showing waveforms of two output signals from the encoder 11 during normal rotation of the CR motor and during its reverse rotation.

As shown in FIGS. 4A and 4B, in both normal rotation and reverse rotation of the CR motor, the pulse ENC-A and the pulse ENC-B are different in phase by 90 degrees. The encoder 4 is so configured that the pulse ENC-A is forward in phase by 90 degrees relative to the pulse ENC-B as shown in FIG. 4A when the CR motor 4 rotates in the normal direction, i.e., when the carriage 3 is moving in its main scanning direction whereas the pulse ENC-A is behind in phase by 90 degrees relative to the pulse ENC-B as shown in FIG. 4B when the CR motor 4 rotates in the reverse direction. Then, one period T of these pulses corresponds to each interval of the slits of the coding plate 12 (for example, $\frac{1}{180}$ inch), and it is equal to the time required for the carriage 3 to move from a slit to another.

On the other hand, the rotary encoder 13 for the PF motor 1 has the same configuration as the linear encoder 11 except that the former is a rotatable disc that rotates in response to rotation of the PF motor 1, and the rotary encoder 13 also outputs two output pulses ENC-A, ENC-B. In ink jet printers, in general, slit interval of a plurality of slits provided on a coding plate of the encoder 13 for the PF motor 1 is $\frac{1}{180}$ inch, and paper is fed by $\frac{1}{1440}$ inch when the PF motor rotates by each slit interval.

FIG. 5 is a perspective view showing a part related to paper feeding and paper detection.

With reference to FIG. 5, explanation is made about the position of the paper detecting sensor 15 shown in FIG. 1. In FIG. 5, a sheet of printing paper 50 inserted into a paper feed inlet 61 of a printer 60 is conveyed into the printer 60 by a paper feed roller 64 driven by a paper feed motor 63. The forward end of the printing paper 50 conveyed into the printer 60 is detected by an optical paper detecting sensor 15, for example. The paper 50 whose forward end is detected by the paper detecting sensor 15 is transported by a paper feed roller 65 driven by the PF motor 1 and a free roller 66.

Subsequently, ink is released from the recording head (not shown) fixed to the carriage 3 which moves along the carriage guide member 32 to print something on the printing paper 50. When the paper is transported to a predetermined position, the terminal end of the printing paper 50 currently under printing is detected by the paper detecting sensor 15. The printing paper 50 after printing is discharged outside from a paper outlet 62 by a discharge roller 68 driven by a gear 67C, which is driven by the PF motor 1 via gears 67A, 67B, and a free roller 69.

FIG. 6 is a perspective view illustrating details of parts associated to paper feeding in a printer, where a paper feeding roller 65 has a rotation axis coupled to a rotary encoder 13.

With reference to FIG. 6 and FIG. 5, the parts in the printer associated to the paper feeding will now be described in details.

When a leading end of a printing paper 50, which has been inserted through a paper feed inlet 61 into a printer 60 by a sheet supplying roller 64, is detected by a paper detecting sensor 15, the paper feeding roller 65 and a follower roller 66 are cooperative in feeding the printing paper 50. The paper feeding roller 65 is provided on and about a smap shaft 83 or a rotation axis of a large gear 67a engaged with a small gear 87 driven by a PF motor 1 while the follower roller 66 is provided in a holder 89 at its paper evacuating end in the context of a paper feeding direction, where the printing paper 50 from a paper supply source is pressed vertically.

The PF motor 1 is fitted in and secured to a frame 86 in the printer 60 by a screw 85, and the rotary encoder 13 is placed in a specified position around the large gear 67a while a character board 14 for the rotary encoder is connected to the smap shaft 83 or the rotation axis of the large gear 67a.

After the printing paper 50, which has already been supplied by the paper feeding roller 65 and the follower roller 66 into the printer, passes over a platen 84 serving to support the printing paper 50, a paper evacuating gear 68 which is rotated by the PF motor 1 via a group of gears, the small gear 87, the large gear 67a, a medium gear 67b, a small gear 88, and a paper evacuating gear 67c, and a toothed roller 69 or a follower roller cooperatively presses and holds the printing paper 50 between them to further feed the printing paper 50 until it is evacuated from the paper outlet 62 to the outside of the printer.

While the printing paper 50 lies over the platen 84, a carriage 3 moves laterally in a space defined above the platen 84 along a guide member 32, and simultaneously, ink is injected from a recording head (not shown) fixed to the carriage 3 to print characters in the printing paper.

Now, an arrangement of a DC unit 6 will be described, which is a prior art DC motor control apparatus used to control a carriage (CR) motor 4 for such an ink jet printer as mentioned above, and additionally, a control method by the DC unit 6 will also be explained.

FIG. 7 is a block diagram showing an arrangement of the DC unit 6 serving as the DC motor control apparatus while FIG. 8 is a timing chart illustrating conditions of encoder pulse edge detection in a speed calculator 6d of the prior art DC unit 6, and FIGS. 9A and 9B are graphs illustrating time-varying motor current and motor speed of the CR motor 4 under control by the DC unit 6.

The DC unit 6 shown in FIG. 7 includes a position operator 6a, a subtracter 6b, a target speed operator 6c, a speed operator 6d, a subtracter 6e, a proportional element 6f, an integral element 6g, a differential element 6h, an adder 6i, a D/A converter 6j, a timer 6k, and an acceleration controller 6m.

The position operator 6a detects rising edges and tail edges of the output pulses ENC-A and ENC-B of the encoder 11, then counts the number of edges detected, and operates the position of the carriage 3 from the counted value. This counting adds "+1" when one edge is detected while the CR motor 4 rotates in the normal direction, and adds "−1" when one edge is detected while the CR motor 4 rotates in the reverse direction. Period of pulses ENC-A and period of pulses ENC-B are equal to the slit interval of the coding plate 12, and the pulses ENC-A and ENC-B are different in phase by 90 degrees. Therefore, the count value "1" of that counting corresponds to ¼ of the slit interval of the coding plate 12. As a result, distance of the movement from the position of the carriage 3, at which the count value corresponds to "0", can be obtained by multiplying the above count value by ¼ of the slit interval. Resolution of the encoder 11 in this condition is ¼ of the slit interval of the coding plate 12. If the slit interval is ¹⁄₁₈₀ inch, then the resolution is ¹⁄₇₂₀ inch.

The subtracter 6b operates positional difference between the target position sent from the CPU 16 and the actual position of the carriage 3 obtained by the position operator 6a.

The target speed calculator 6c computes a target velocity of the carriage 3 by referring to a positional deviation produced by a subtracter 6b. A result of the arithmetic operation is obtained by a multiply operation of the positional deviation by a gain KP. The gain KP varies depending upon the positional deviation. A value of the gain KP may be stored in a look-up table not shown.

The speed calculator 6d computes a velocity of the carriage 3 from the output pulses ENC-A and ENC-B from the encoder 11. The velocity is obtained in a manner as explained below.

In order to implement this velocity computation, first leading edges and trailing edges of the output pulses ENC-A and ENC-B from the encoder 11 must be detected, and the conditions of encoder pulse edge detection in the prior art speed calculator 6d assume two types of patterns as illustrated in FIGS. 8A and 8B.

In the first condition of the encoder pulse edge detection illustrated in FIG. 8A, either one of the output pulses ENC-A and ENC-B, namely the output pulse ENC-A in this case, for example, is used to sequentially detect only the leading edges of the output pulse to count periods of time between two of the edges corresponding to intervals between two of slits in a character board 12 by using a timer counter. A count value is denoted by T (T1=T1, T2, . . . ), and, assuming that the intervals of two of the slits in the character board 12 are represented by λ, the velocity of the carriage can be designated as λ/T and be sequentially obtained.

Under the second condition of pulse edge detection illustrated in FIG. 8B, both the output pulses ENC-A and ENC-B are used to sequentially detect their respective leading edges and trailing edges, so as to similarly permit a timer counter to count time intervals between the edges corresponding to one quarter of the interval between the slits in the character board 12. Assuming that a resultant count value is T (T=T1, T2, . . . ) and that the interval between the slits in the character board 12 is λ, the velocity of the carriage can be sequentially obtained as λ/(4T).

The above-mentioned first condition of pulse edge detection is employed when the velocity may be appropriately detected even with relatively low resolution, and the above-mentioned second condition is employed when the velocity must be detected with relatively high resolution.

The subtracter 6e operates speed difference between the target speed and the actual speed of the carriage 3 operated by the speed operator 6d.

The proportional element 6f multiplies the speed difference by a constant Gp, and outputs its multiplication result. The integral element 6g cumulates products of speed differences and a constant Gi. The differential element 6h multiplies the difference between the current speed difference and its preceding speed difference by a constant Gd, and outputs its multiplication result. Operations of the proportional element 6f, the integral element 6g and the differential element 6h are conducted in every period of output pulses ENC-A of the encoder 11, synchronizing with the rising edge of each output pulse ENC-A, for example.

Outputs of the proportional element 6f, the integral element 6g and the differential element 6h are added in the adder 6i. Then, the result of the addition, i.e., the drive current of the CR motor 4, is sent to the D/A converter 6j and converted into an analog current. Based on this analog current, the CR motor 4 is driven by the driver 5.

The timer 6k and the acceleration controller 6m are used for controlling acceleration whereas PID control using the proportional element 6f, the integral element 6g and the differential element 6h is used for constant speed and deceleration control during acceleration.

The timer 6k generates a timer interrupt signal every predetermined interval in response to a clock signal sent from the CPU 16.

The acceleration controller 6m cumulates a predetermined current value (for example 20 mA) to the target current value every time it receives the timer interrupt signal, and results of the integration, i.e, target current values of the DC motor during acceleration, are sent to the D/A converter 6j from time to time. Similarly to PID control, the target current value is converted into an analog current by the D/A converter 6j, and the CR motor 4 is driven by the driver 5 according to this analog current.

The driver 5 has four transistors, for example, and it can create (a) a drive mode for rotating the CR motor 4 in the normal or reverse direction; (b) a regeneration brake drive mode (a short brake drive mode, which is the mode maintaining a halt of the CR motor); and (c) a mode for stopping the CR motor, by turning those transistors ON or OFF in accordance with outputs from the D/A converter 6j.

Next explained is the performance of the DC unit 6, that is, the conventional DC motor control method, with reference to FIGS. 9A and 9B.

While the CR motor 4 stops, when a start instruction signal for starting the CR motor 4 is sent from the CPU 16 to the DC unit 6, a start initial current value 10 is sent from the acceleration controller 6m to the D/A converter 6j. This start initial current value $I_0$ is sent together with the start instruction signal from the CPU 16 to the acceleration controller 6m. Then, this current value $I_0$ is converted into an analog current by the D/A converter 6j and sent to the driver 5 which in turn start the CR motor 4 (see FIGS. 9A and 9B). After the start instruction signal is received, the timer interrupt signal is generated every predetermined interval from the timer 6k. The acceleration controller 6m cumulates a predetermined current value (for example, 20 mA) to the start initial current value $I_0$ every time it receives the timer interrupt signal, and sends the cumulated current value to the D/A converter 6j. Then, the cumulated current value is converted into an analog current by the D/A converter 6j and sent to the driver 5. Then, the CR motor is driven by the driver 5 so that the value of the current supplied to the CR motor 4 becomes the cumulated current value mentioned above, and the speed of the CR motor 4 increases (see FIG. 9B). Therefore, the current value supplied to the CR motor 4 represents a step-like aspect as shown in FIG. 9A. At that time, the PID control system also works, but the D/A converter 6j selects and employs the output from the acceleration controller 6m.

Cumulative processing of current values of the acceleration controller 6m is continued until the cumulated current value reaches a fixed current value $I_s$. When the cumulated current value reaches the predetermined value $I_s$ at time t1, the acceleration controller 6m stops its cumulative processing, and supplies the fixed current value $I_s$ to the D/A converter 6j. As a result, the CR motor 4 is driven by the driver 5 such that the value of the current supplied to the CR motor 4 becomes the current value $I_s$ (see FIG. 9A).

In order to prevent the speed of the CR motor 4 from overshooting, if the speed of the CR motor 4 increases to a predetermined value V1 (see time t2), the acceleration controller 6m makes a control to reduce the current supplied to the CR motor 4. At that time, the speed of the CR motor 4 further increases, but when it reaches a predetermined speed Vc (see time t3 of FIG. 9B), the D/A converter 6j selects the output of the PID control system, i.e., the output of the adder 6i, and PID control is effected.

That is, based on the positional difference between the target position and the actual position obtained from the output of the encoder 11, the target speed is operated, and based on the speed difference between this target speed and the actual speed obtained from the output of the encoder 11, the proportional element 6f, the integral element 6g and the differential element 6h act to perform proportional, the integral and the differential operations, respectively, and based on the sum of results of these operations, the CR motor 4 is controlled. These proportional, integral and differential operations are conducted synchronously with the rising edge of the output pulse ENC-A of the encoder 11, for example. As a result, speed of the DC motor 4 is controlled to be a desired speed Ve. The predetermined speed VC is preferably a value corresponding to 70 through 80% of the desired speed Ve.

From time t4, the DC motor 4 reaches the desired speed, and the carriage 3 also reaches the desired constant speed Ve and can perform printing.

When the printing is completed and the carriage 3 comes close to the target position (see time t5 in FIG. 9B), the positional difference becomes smaller, and the target speed also becomes slower. Therefore, the speed difference, i.e., the output of the subtracter 6e becomes a negative value, and the DC motor 4 is decelerated and stops at time t6.

However, the encoder pulse edge detecting conditions in the speed calculator 6d in the prior art motor control device or the DC unit 6 invite the following problems. That is, under the first condition of pulse edge detection, when the velocity of the carriage 3 is low, the resolution of the detection of the motor velocity is too low, and under the second condition of pulse edge detection, dispersions of duty ratios of the pulses and of phase differences between both the pulses occur to disable the motor control device for constantly detecting the motor velocity with high accuracy under either of the pulse edge detection conditions. There also arises an additional problem that in motor stop control, an accuracy of the positioning is poor at low speed.

In the ink jet printer configured as described above, paper feeding is, as illustrated in FIG. 5, effected by using the paper feeding roller 65 rotated by the PF motor 1 and the follower roller 66. The follower roller 65 utilizes a spring 80 to press the printer paper 50 against the paper-feeding roller 65, as illustrated in FIG. 10.

In reality, when the PF motor 1 is actuated, the spring 80 causes the printing paper 50 to move in a reverse direction to a normal feeding direction thereof, which, in turn, causes the paper feeding roller 65 to rotate in reverse, or more specifically, which causes the encoder 13 attached to the paper feeding roller 65 to rotate in reverse. When the PF motor 1 is actuated to cause reverse rotations of the paper feeding roller 65 to which the encoder 13 is attached, the speed calculator 6d produces inaccurate output which is a result of arithmetic operations of the velocity based upon output from the encoder 13, or otherwise, the timer counter used in the arithmetic operations for the velocity by the speed calculator 6d causes overflow which disables the timer counter for detecting accurate velocity.

SUMMARY OF THE INVENTION

It is an object of the invention to provide a motor control apparatus configured to greatly enhance a resolution of detection of a motor velocity and to bring about constantly highly accurate detection of the motor velocity and it is also an object to provide a control method of doing the same.

The motor control apparatus according to the invention has a basic arrangement to detect a motor velocity which includes a signal generator producing a first pulse signal proportional in cycle to a motor velocity and a second pulse signal proportional in cycle to the motor velocity and different in phase from the first pulse signal is about one quarter of a single cycle, a pulse edge detector distinctively detecting leading edges and trailing edges of the first and second pulse signals from one another, a time counter measuring a period of time between the pulse edges in the same direction of the same pulse signal, and a velocity converter using the period of time measured by the time counter to sequentially convert it into the motor velocity and thereby detect the motor velocity, and such an arrangement of the invention can greatly enhance a resolution of the detection of the motor velocity and permit constantly accurate detection of the motor velocity.

The motor control apparatus according to the invention may have a practical arrangement to detect a motor velocity which includes a signal generator producing a first pulse signal proportional in cycle to a motor velocity and a second pulse signal proportional in cycle to the motor velocity and different in phase from the first pulse signal by about one quarter of a single cycle, a detection condition memory storing a plurality of detection conditions including a condition of distinctively detecting pulse edges in the same direction of the same pulse signal, so as to output either of the detection conditions depending upon a specified condition, a detection condition setting unit specifying the detection conditions received from the detection condition memory, a pulse edge detector detecting part or all of leading and trailing edges of the first and second pulse signals depending upon the detection conditions specified by the detection condition setting unit, a time counter measuring a period of time between the pulse edges detected by the pulse edge detector, and a velocity converter using the period of time measured by the time counter to sequentially convert it into said motor velocity and thereby detect said motor velocity, and such an arrangement of the invention, when the plurality of conditions of encoder pulse edge detection are appropriately combined with one another, permits more efficient and more accurate detection of the motor velocity.

The specified condition may include the motor velocity, the number of the cycles of the first or the second pulse signal, or an amount of actuation by the motor.

The time counter may simultaneously measure at least four periods of time between the pulse edges in parallel with one another.

The time counter may measure the periods of time between the pulse edges in the same direction of the same pulse signal when the above-mentioned pulse detector distinctively detects the pulse edges in the same direction of the same pulse signal.

The detection condition memory and the detection condition setting unit may be comprised of either one of PROM, EEPROM, and ASIC.

The velocity converter may execute conversion into the motor velocity by dividing a distance corresponding to an interval between the pulse edges by the period of time.

The control apparatus according to the invention further includes a comparison reference value memory storing comparison reference values determined for each of the pulse edges, from the one preceding by a specific number of pulse edges to a target edge which is a pulse edge indicating a targeted stop position of an object to be driven by the motor, to the target edge, and a motor stop controller comparing the comparison reference value with the motor velocity for each of the pulse edges from the specific number of the pulse edges before the target edge to the target edge so as to give a command to stop the motor when the motor velocity is equal to or over the comparison reference value.

The comparison reference value memory may be comprised of either one of PROM, EEPROM, and ASIC while the motor stop controller may be comprised of a CPU.

The pulse edge detector, the time counter, and the velocity converter may be comprised of a CPU.

The signal generator may be comprised of an encoder.

A motor control method according to the invention will be outlined as follows. The method is directed to detecting a motor velocity by performing the steps of distinctively detecting leading and trailing edges of two pulse signals proportional in cycle to the motor velocity and different in phase by about one quarter of the cycle from one another, measuring a period of time between pulse edges in the same direction of the same pulse signal, using the period of time between the pulse edges to sequentially convert it into the motor velocity and thereby detect the motor velocity.

The motor control method according to the invention has a basic configuration directed to detecting a motor velocity with greatly enhanced resolution and with constant high accuracy, comprising: a first step of generating a first pulse signal proportional in cycle to a motor velocity and a second pulse signal proportional in cycle to the motor velocity and different in phase from the first pulse signal by about one quarter of a single cycle; a second step of distinctively detecting leading and trailing edges of the first and second pulse signals from one another; a third step of measuring a period of time between the pulse edges in the same direction of the same pulse; and a fourth step of using a measurement result of the period of time to sequentially convert it into the motor velocity and thereby detect the motor velocity.

The fourth step as mentioned above may include dividing a distance corresponding to an interval between the pulse edges by the period of time to perform the conversion to the motor velocity.

The control method according to the invention further includes a fifth step of comparing said motor velocity with comparison reference values for individual pulse edges from a pulse edge preceding by a predetermined number of pulse edges to a target edge which is a pulse edge indicating a target stop position of an object to be driven by said motor to said target edge, at respective said pulse edges, and issuing a command to stop the motor when said motor velocity is equal to or over said comparison reference values.

The motor control method according to the invention has a practical configuration directed to detecting a motor velocity, comprising: a first step of generating a first pulse signal proportional in cycle to a motor velocity and a second pulse signal proportional in cycle to the motor velocity and different in phase from the first pulse signal by about one quarter of a cycle; a second step responsive to a specified condition to select one of a plurality of conditions of detection which include a condition of distinctively detecting pulse edges in the same direction of the same pulse signal; a third step depending upon the selected condition of detection to detect part or all of leading and trailing edges of the first and second pulse signals; a fourth step of measuring a period of time between the detected pulse edges; a fifth step of using a measurement result of the period of time to sequentially convert it into the motor velocity and thereby detect the motor velocity. With such a configuration, when the plurality of conditions of detecting the encoder pulse edges are combined with one another, the motor velocity can be detected with further enhanced efficiency and accuracy.

The specified condition may include the motor velocity, the number of the cycles of the first or the second pulse signal, or an amount of actuation by the motor.

In distinctively detecting the pulse edges in the same direction of the same pulse signal in the third step as mentioned above, a period of time between the pulse edges in the same direction of the same pulse may be measured in the fourth step.

In the fifth step, a distance corresponding to an interval between the pulse edges may be divided by the period of time to execute the conversion into the motor velocity.

The control method according to the invention may further comprise a sixth step of comparing said motor velocity with comparison reference values for individual pulse edges from a pulse edge preceding by a predetermined number of pulse edges to a target edge which is a pulse edge indicating a target stop position of an object to be driven by said motor to said target edge, at respective said pulse edges, and issuing a command to stop the motor when said motor velocity is equal to or over said comparison reference values.

The pulse signals may be generated by an encoder.

In the motor control apparatus and motor control method according to the invention as mentioned above, the encoder may be a linear encoder fixed to a carriage of a serial printer while the motor may be a carriage motor actuating the carriage.

The encoder may also be a rotary encoder for a paper feeding motor in a serial printer while the motor may be a paper feeding motor that feeds paper in the serial printer.

It is another object of the invention to provide a motor control apparatus, a motor control method, and, a recording medium storing control programs for a motor, which, upon actuation by a motor, permit accurate detection of a velocity of the motor even when reverse rotations are caused in a unit to which an encoder is attached.

The motor control apparatus according to the invention includes a reverse rotation detector for detecting whether, upon actuation by the motor, reverse rotations are caused in an attachment unit where the encoder is attached, from output pulses from the encoder rotated by rotations of the motor, a first pulse counter counting edges of the output pulses from the encoder after the attachment unit has rotated from a reverse direction to a normal direction when the reverse rotations are caused in the attachment unit, to give a start command when a counted value reaches a first specified value, and a speed calculator receiving the start command when the reverse rotations are caused in the attachment unit, to compute the motor velocity from the output pulses from the encoder.

The motor control apparatus may further include a second pulse counter which, upon actuation by the motor, counts the edges of the output pulses from the encoder to give a start command when a counted value reaches a second specified value, and the speed calculator may be configured to receive the start command output from the first pulse counter when the reverse rotations are caused in the attachment unit, or receive the start command output from the second pulse counter when the reverse rotations are not caused in the attachment unit, to start computation of the velocity.

The motor may be a paper feeding motor in a printing machine.

The motor control apparatus may include a speed controller controlling the motor velocity by referring to a difference between a targeted velocity of the motor and the motor velocity obtained through the computation by the speed calculator.

The motor control method according to the invention includes the steps of referring to output pulses from an encoder rotated by rotations of a motor to detect, upon actuation by the motor, whether reverse rotations are caused in an attachment unit where the encoder is attached, counting edges of the output pulses from the encoder after the attachment unit has rotated from a reverse direction to a normal direction when reverse rotations are caused in the attachment unit to issue a start command when a counted value reaches a first specified value, and computing the motor velocity from the output pulses from the encoder when the start command is received.

The motor control method may further include a step of counting edges of the output pulses from the encoder prior to the step of computing the motor velocity, to issue a start command when a counted value reaches a second specified value or when reverse rotations are not caused in the attachment unit.

The motor control method may further include a step of controlling the motor velocity from a difference between a targeted velocity of the motor and the computed velocity after the step of computing the motor velocity.

The motor may be a paper feeding motor in a printing machine.

The record medium storing control programs for a motor according to the invention includes the steps of detecting, upon actuation by the motor, if reverse rotations are caused in an attachment unit where an encoder is attached, from output pulses from the encoder rotated by rotations of the motor, counting edges of the output pulses from the encoder after the attachment unit has rotated from a reverse direction to a normal direction, when reverse rotations are caused in the attachment unit, to issue a start command when a counted value reaches a first specified value, and computing the motor velocity when the start command is received, by ring to the output pulses from the encoder.

The record medium storing computer programs according to the invention stores a computer program to execute any of the steps of the motor control method according to the invention in a computer system.

BRIEF DESCRIPTION OF THE DRAWINGS

FIG. 10 is a diagram illustrating a paper feeding mechanism;

DESCRIPTION OF THE PREFERRED EMBODIMENTS

With reference to the appended drawings, practical embodiments of a motor control apparatus and motor control method according to the invention will be described, as well as an embodiment of a record medium storing computer programs to execute the motor control method.

Figure 1:
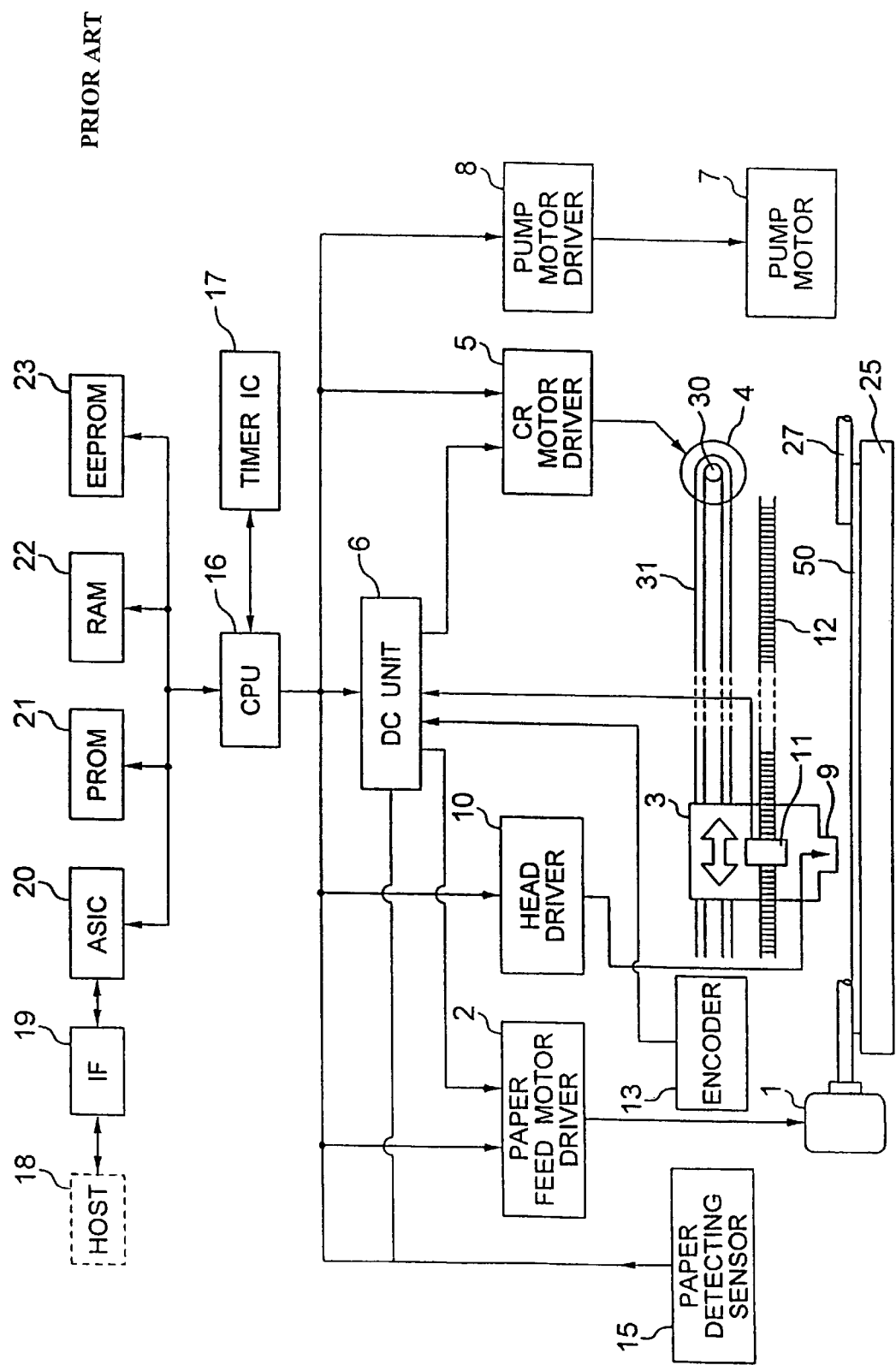
FIG. 1 is a block diagram showing a schematic configuration of an ink jet printer.
Figure 2:
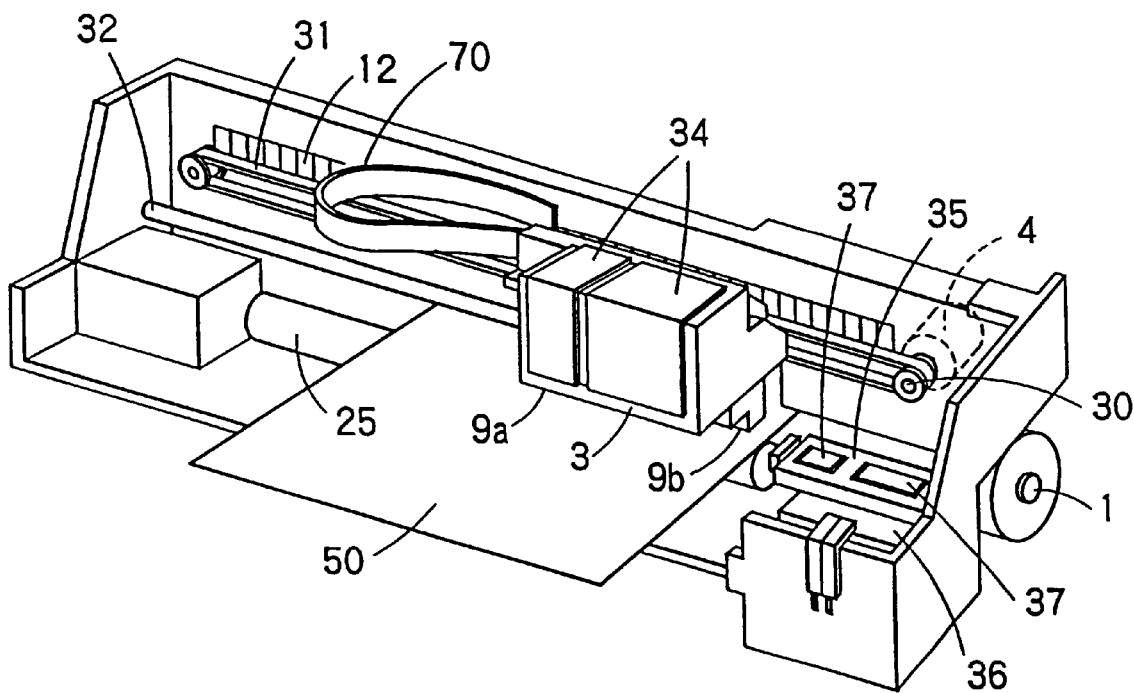
FIG. 2 is a perspective view showing a configuration around a carriage 3 of the ink jet printer.
Figure 3:
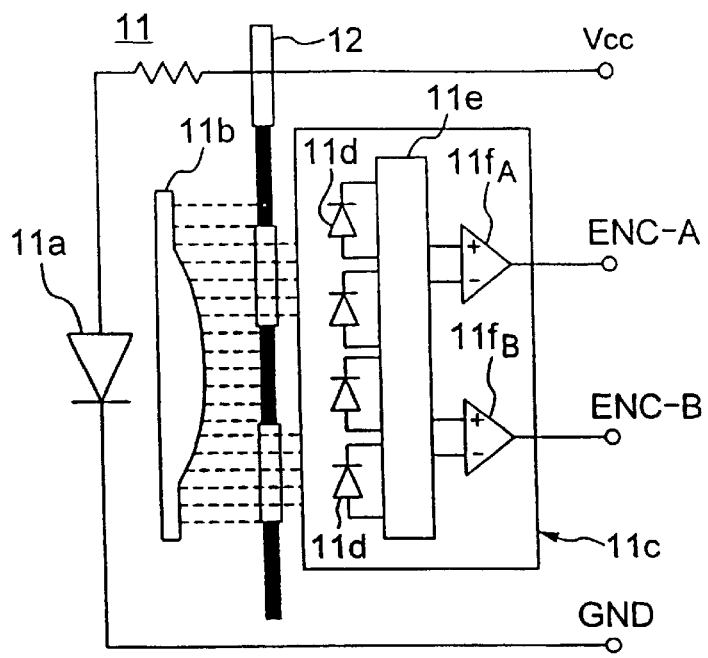
FIG. 3 is an illustrative view showing an exemplary configuration of a linear encoder 11 attached to the carriage 3.
Figure 4A:
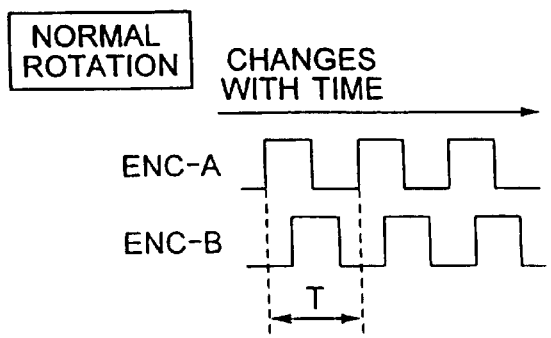
FIGS. 4A and 4B are timing charts showing waveforms of two output signals from the encoder 11 when a CR motor rotates in normal and reverse directions, respectively.
Figure 4B:
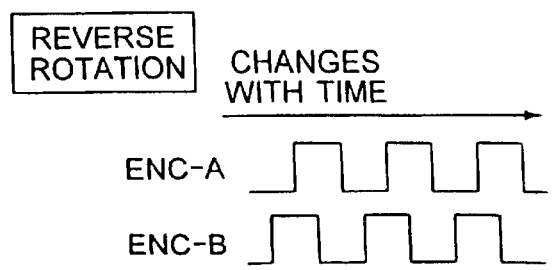
Figure 5:
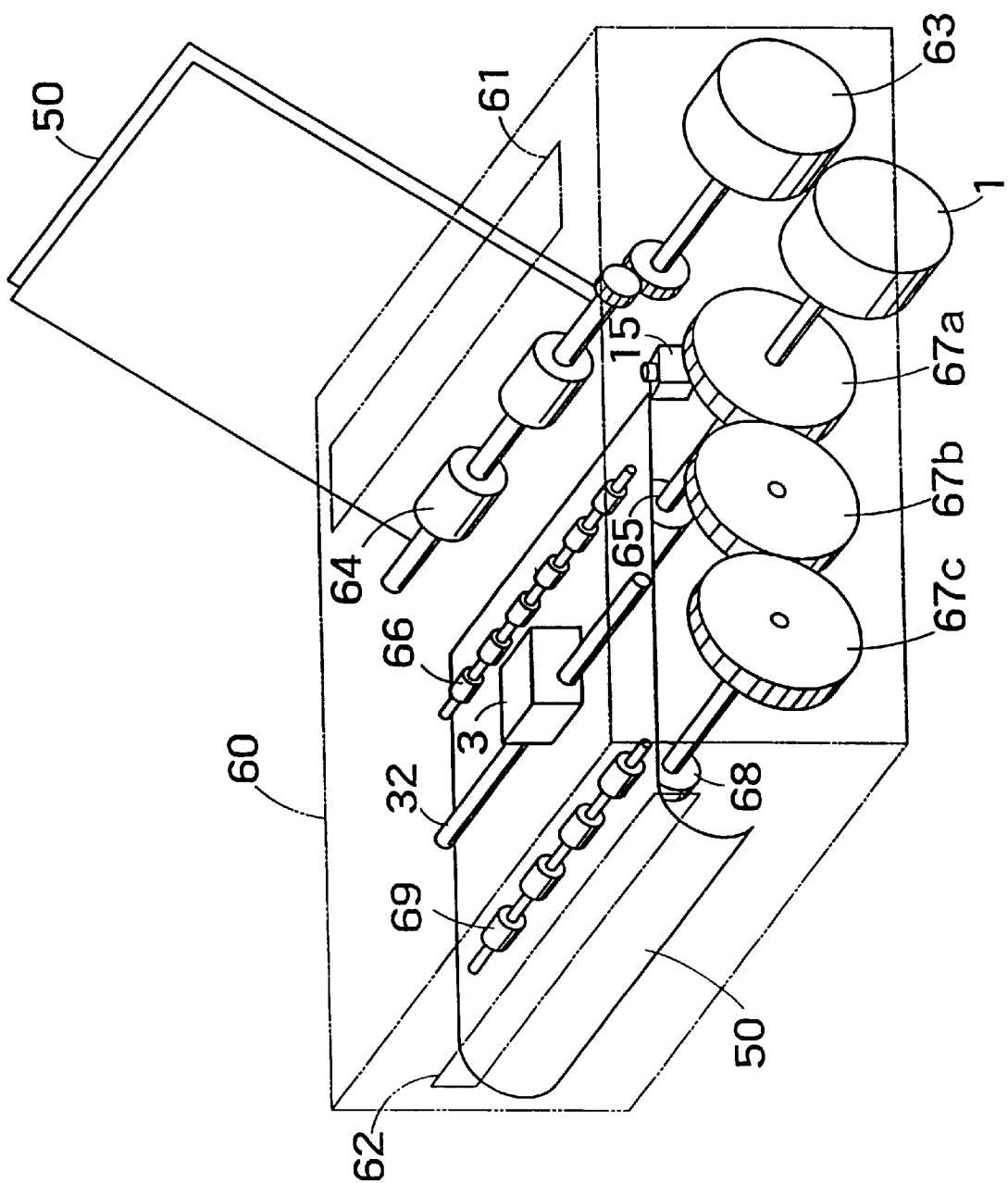
FIG. 5 is a perspective view showing parts related to paper feeding and paper detection in the printer.
Figure 6:
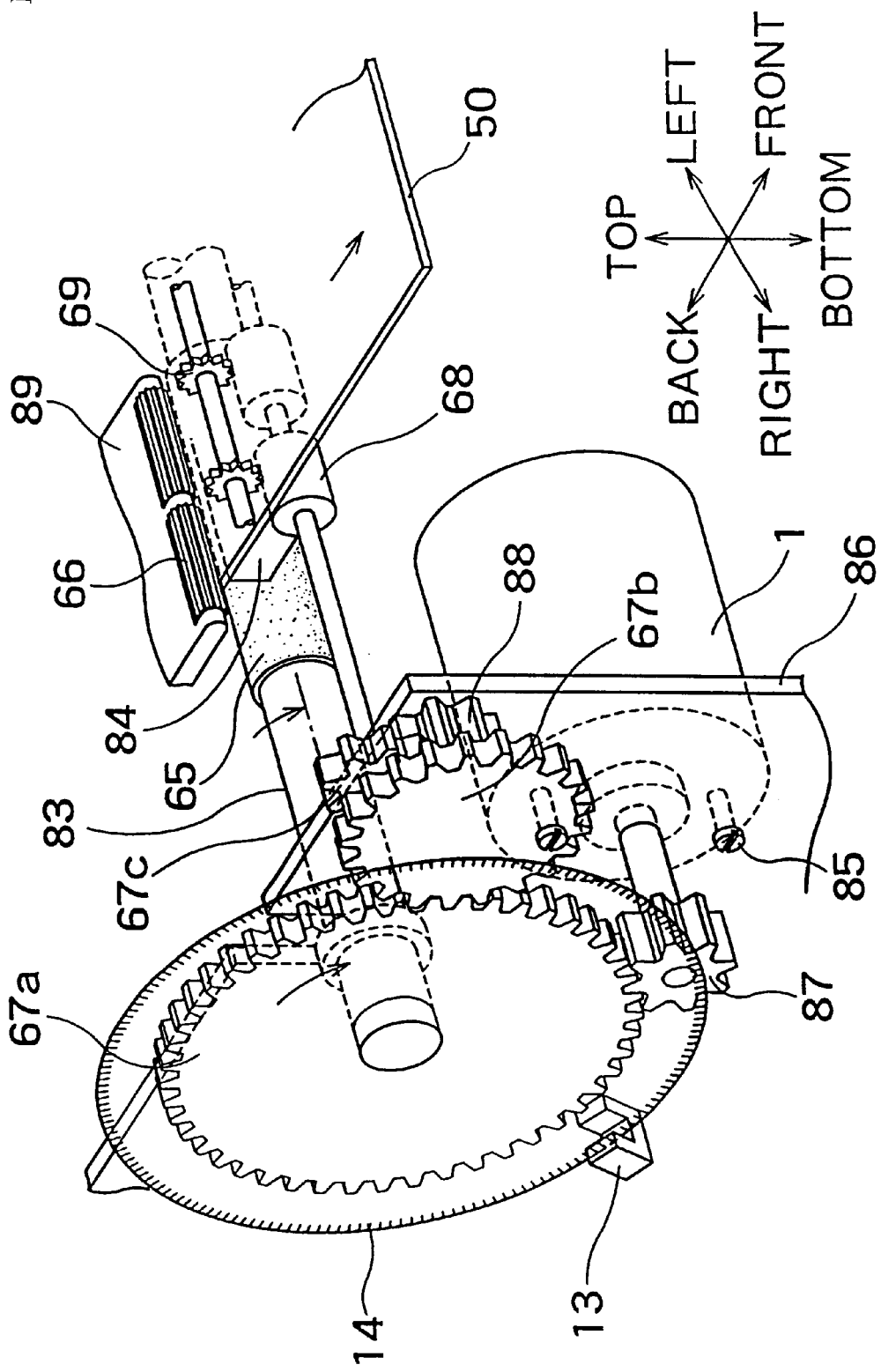
FIG. 6 is a perspective view showing, in details, parts related to paper feeding in the printer.
Figure 11:
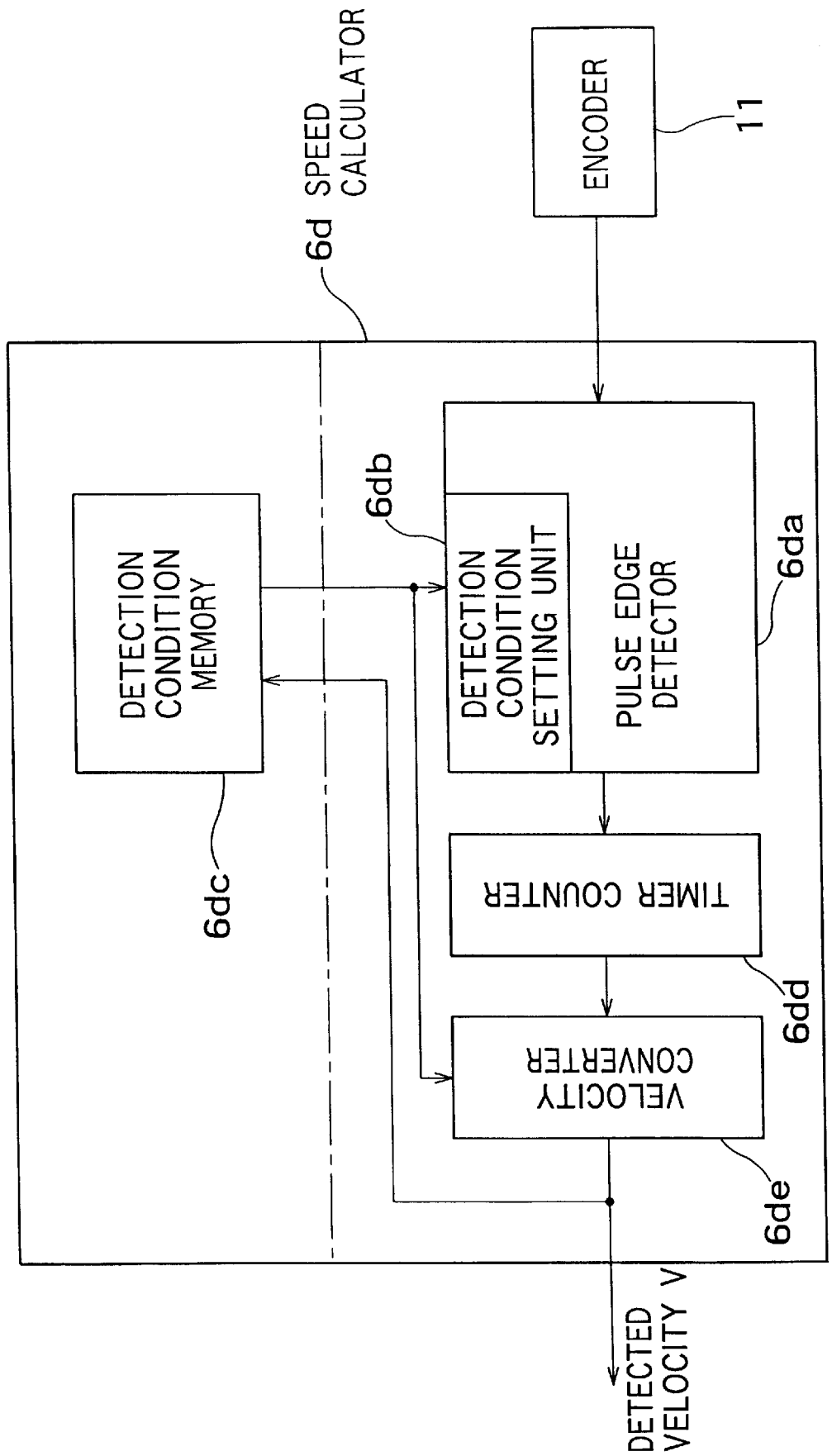
FIG. 11 is a block diagram showing a configuration of the speed calculator 6d of the DC unit 6 which serves as a motor control apparatus according to the invention.
Figure 12A:
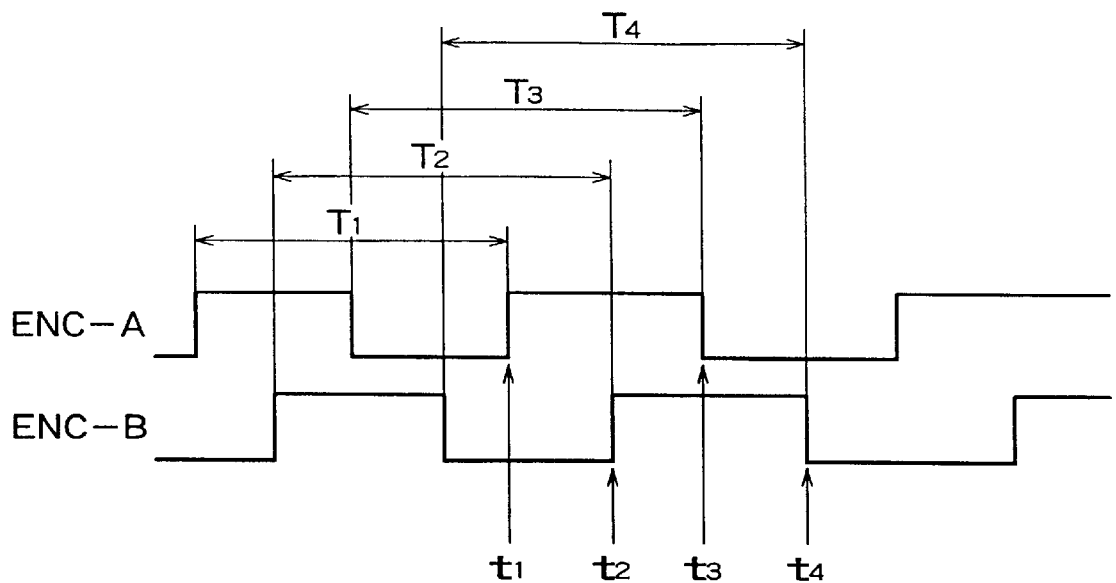
FIGS. 12A, 12B, and 12C are timing charts showing conditions of encoder pulse edge detection in the speed calculator 6d of the DC unit 6 which serves as a motor control apparatus according to the invention.
Figure 12B:
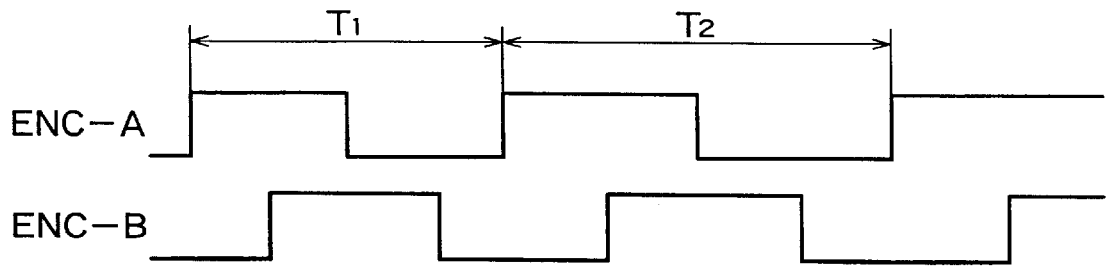
Figure 12C:
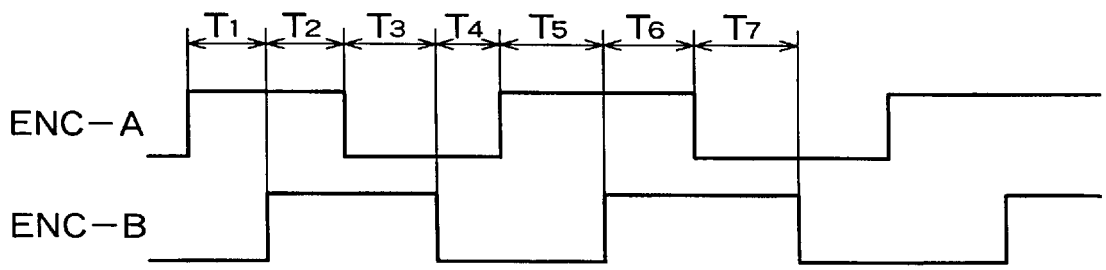

FIG. 11 is a block diagram showing a configuration of a speed calculator 6d of a DC unit 6 which serves as a motor control apparatus according to the invention while FIGS. 12A, 12B, and 12C are timing charts showing conditions of encoder pulse edge detection in the speed calculator 6d in the DC unit 6 which serves as the motor control apparatus according to the invention. An overall configuration of the DC unit 6 is similar to that illustrated in a block diagram in FIG. 7 while an overall schematic configuration of an ink jet printer is similar to that illustrated in a block diagram in FIG. 1.

The speed calculator 6d in the motor control apparatus according to the invention in FIG. 11 is comprised of a pulse edge detector 6da detecting and producing pulse edges of encoder pulses ENC-A and ENC-B received from an encoder 11, depending upon predetermined conditions of pulse edge detection, a detection condition setting unit 6db setting the conditions of pulse edge detection in the pulse edge detector 6da, a detection condition memory 6dc storing more than one conditions of pulse edge detection specified by the detection condition setting unit 6db to output conditions of pulse edge detection corresponding to a motor velocity to the detection condition setting unit 6db for setting of the detection conditions, a timer counter 6dd measuring a period of time between the pulse edges sequentially detected by and released from the pulse edge detector 6da depending upon the specified conditions of pulse edge detection, and a speed converter 6de using a distance corresponding to an interval between the pulse edges and a measurement result of the period of time from the timer counter 6dd under the specified conditions of pulse edge detection to perform arithmetic operations and effect the conversion into a motor velocity.

The motor control apparatus and control method according to the invention are most noteworthy in that two encoder pulses ENC-A and ENC-B received from the encoder 11 have their respective leading and trailing edges, and those pulse edges in the same direction of the same encoder pulse (namely, the encoder pulse of the same channel) are distinctively detected. A period of time is measured between the pulse edges in the same direction of the same encoder pulse, and a distance corresponding to an interval between the pulse edges in the same direction of the same encoder pulse and the period of time between the pulse edges are used to perform the conversion into a motor velocity. More specifically, as shown in a timing chart in FIG. 12A, the period of time between the pulse edges such as a period of time T1 from a leading edge of the encoder pulse ENC-A to an immediately succeeding leading edge of the encoder pulse ENC-A, a period of time T2 from a leading edge of the encoder pulse ENC-B to an immediately succeeding leading edge of the encoder pulse ENC-B, a period of time T3 from a trailing edge of the encoder pulse ENC-A to an immediately succeeding trailing edge of the encoder pulse Enc-A, a period of time T4 from a trailing edge of the encoder pulse ENC-B to an immediately succeeding trailing edge of the encoder pulse ENC-B, and so forth, are sequentially measured by following timings at points of time such as t1, t2, t3, t4, and so forth, and a distance corresponding to an interval between two adjacent leading or trailing edges in the same direction of the same encoder pulse and the period of time between those pulse edges are used to execute into a motor velocity.

Figure 8A:
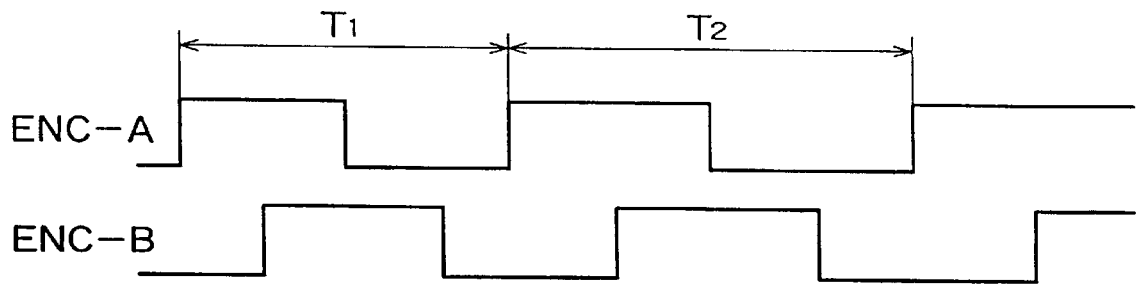
FIGS. 8A and 8B are timing charts showing conditions of encoder pulse edge detection in a speed calculator 6d in the prior art DC unit 6.
Figure 8B:
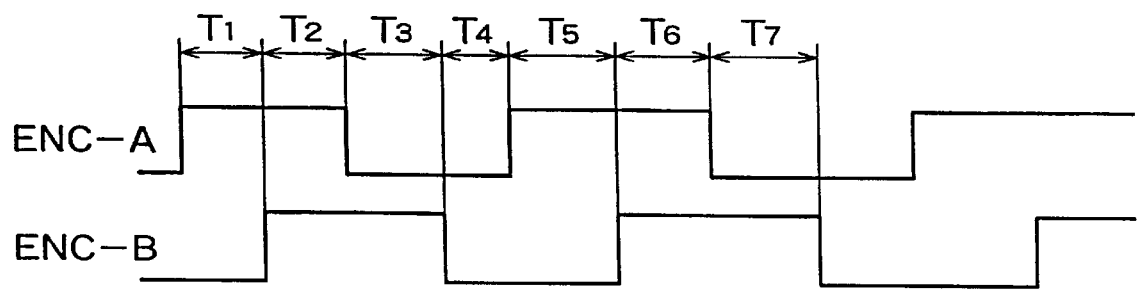
Figures 9A, 9B:
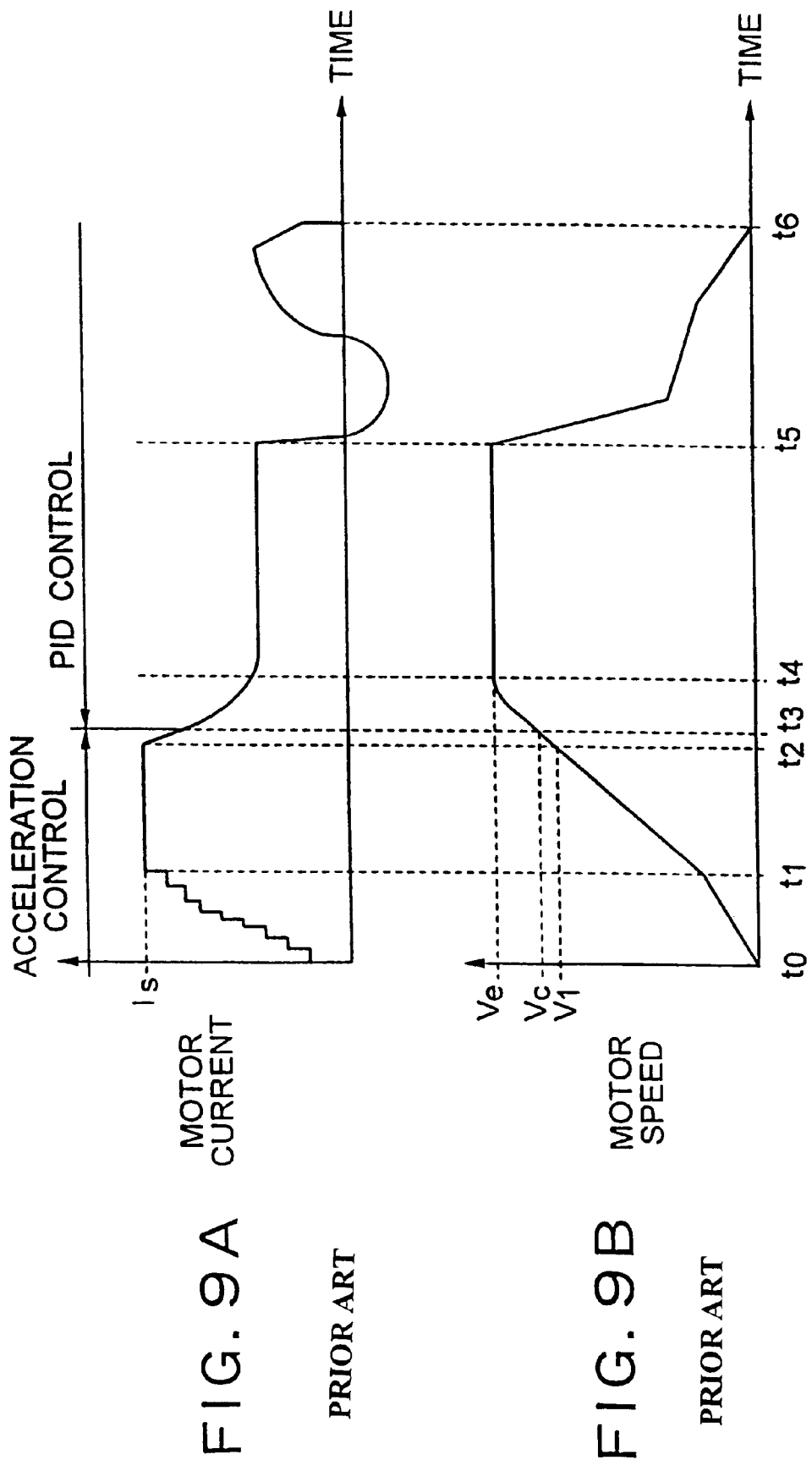
FIGS. 9A and 9B are graphs showing motor current and motor velocity in a CR motor 4 controlled by the DC unit 6.

Timing charts shown in FIGS. 12B and 12C are similar to those shown in timing charts in FIGS. 8A and 8B where conditions of encoder pulse edge detection in the speed calculator 6d of the prior art DC unit 6 are represented.

With the motor control apparatus and motor control method according to the invention, detecting the edges of the encoder pulses and then measuring a period of time elapsing for a single cycle of any of the encoder pulse, under the condition of encoder pulse edge detection as shown in FIG. 12A, to execute conversion into the motor velocity, can result in shooting troubles which would arise when, under the conditions of encoder pulse edge detection as shown in FIGS. 12B and 12C, the edges of the encoder pulses are detected, and the period of time is measured to perform the conversion into the motor velocity.

With the condition of encoder pulse edge detection as shown in FIG. 12B, the encoder pulse edges are detected every single cycle of either of the encoder pulse, and then a period of time elapsing for the single cycle of the encoder pulse is measured, and hence, there arises a problem that a resolution of detection of the motor velocity is undesirably poor especially when the motor velocity is low. On the contrary, with the condition of encoder pulse edge detection as shown in FIG. 12A, all the encoder pulse edges in the same direction of the same encoder pulse are distinctively detected, and a period of time elapsing for a single cycle of the encoder pulse is measured for each edge in the same direction of the same encoder, so that a frequency of the detection of the motor velocity becomes four times as many as the prior art embodiment, and this brings about a greatly enhanced resolution of the detection of the motor velocity.

With the condition of encoder pulse edge detection as shown in FIG. 12C, although all the encoder pulse edges are detected and periods of time between the pulse edges are measured, a reference period of time is regarded as that from one edge of one of the encoder pulses to an immediately succeeding edge of the other encoder pulse which is equal to one quarter of a single cycle of the encoder pulses, in order to measure the periods of time. Thus, when a duty ratio of each encoder pulse and a phase difference between both the encoder pulses vary, the period of time equivalent to one quarter of the cycle of either of the encoder pulses are not measured accurately, and thus, there arises a problem that the motor velocity cannot be detected with constant high accuracy. In contrast, under the condition of encoder pulse edge detection as illustrated in FIG. 12A, all the encoder pulse edges in the same direction of the same encoder pulse are distinctively detected, and a period of time elapsing for a single cycle of the encoder pulse whose pulse edges have been detected is measured. Since the measured duration corresponding to the single cycle of the encoder pulse is constantly accurately in proportion to the motor velocity at that point of time of the measurement, and also since it is never be affected by variations of the duty ratio of either of the encoder pulses and of the phase difference between them, the motor velocity can be detected with constant high accuracy from a distance corresponding to the single cycle of either of the encoder pulses and the period of time for the single cycle of the encoder pulse.

In this way, detecting the encoder pulse edges and measuring the period of time elapsing for the single cycle of the encoder pulse under the condition of encoder pulse edge detection as illustrated in FIG. 12A can bring about constantly accurate detection of the motor velocity, giving a solution of the problems caused in the prior art embodiments.

However, it should be noted that there is not always disadvantage in detecting the encoder pulse edges and measuring the corresponding period of time under the conditions of encoder pulse edge detection as illustrated in FIGS. 12B and 12C.

For instance, when the motor velocity is sufficiently high, a desired resolution of detection of the motor velocity can be obtained even by detecting the encoder pulse edges and measuring the corresponding period of time under the condition of encoder pulse edge detection as illustrated in FIG. 12B. Also, it is sometimes preferable using the condition of encoder pulse edge detection illustrated in FIG. 12B to those in FIG. 12A, depending upon the ability of operations by the speed calculator 6d comprised of CPU or other elements. It is also preferable for velocity information to be given even if being accompanied with some errors.

Thus, appropriate combinations of the conditions of encoder pulse edge detection illustrated in FIGS. 12A, 12B, and 12C, respectively can lead to more efficient and more accurate detection of the motor velocity.

Accordingly, the speed calculator 6d in the DC unit 6 serving as the motor control apparatus according to the invention as shown in FIG. 11 has a configuration where the conditions of encoder pulse edge detection illustrated in FIGS. 12A, 12B, and 12C can be respectively combined with one another. Its operation will be detailed below.

The detection condition memory 6dc stores three variations of the conditions of encoder pulse edge detection as mentioned in terms of FIGS. 12A, 12B, and 12C, and the conditions of encoder pulse edge detection suitable to a specific condition are output to the detection condition setting unit 6db and the velocity converter 6de, respectively. The specific condition used here for selectively releasing the conditions of encoder pulse edge detection is a motor velocity value converted from the encoder pulses or the number of cycles of the encoder pulses, as will be explained later. Otherwise, the specific condition may include an amount of actuation by the motor, and specifically, a displacement of an object to be driven by the motor.

The detection condition setting unit 6db receives the conditions of encoder pulse edge detection from the detection condition memory 6dc and specifies them, depending upon the converted value from the encoder pulses into the motor velocity. For instance, the condition of encoder pulse edge detection shown in FIG. 12C is specified for the first single cycle or several cycles after resuming actuation of the motor in its stop mode, and thereafter, the condition of encoder pulse edge detection shown in FIG. 12A is specified when the motor velocity is less than a predetermined value while the condition of encoder pulse edge detection shown in FIG. 12B is specified when the motor velocity is equal to or above the predetermined value.

The pulse edge detector 6da detects the pulse edges of the encoder pulses ENC-A and ENC-B received from the encoder 11, depending upon the specified condition of pulse edge detection to sequentially output the detected pulse edges to the timer counter 6dd. When the condition of encoder pulse edge detection shown in FIG. 12C is specified, the pulse edge detector 6da regards the pulse edges as the ones of the same type and sequentially issues them without indiscriminate from one another while, when the condition of encoder pulse edge detection shown in FIG. 12A is specified, the pulse edge detector 6da issues leading and trailing edges of the encoder pulse ENC-A and leading and trailing edges of the encoder pulse ENC-B so that each type of the edges of each encoder pulse is identifiable. When the conditions of encoder pulse edge detection shown in FIG. 12B is specified, the pulse edge detector 6da issues only leading edges of the encoder pulse ENC-A so that they are distinctive from other pulse edges.

The timer counter 6dd measures a period of time between the pulse edges output from the pulse edge detector 6da. However, when the pulse edges received from the pulse edge detector 6da are respectively identifiable ones of a plurality of different types, the period of time between the same type of the pulse edges is measured; in other words, the period of time between the pulse edges in the same direction is measured. Thus, the timer counter 6dd is designed to simultaneously measure at least four periods of time between the pulse edges in parallel when the condition of encoder pulse edge detection shown in FIG. 12A is specified, so as to measure the period of time elapsing between the pulse edges in the same direction of the same encoder pulse.

The timer counter 6dd sequentially outputs a measurement result of the period of time between the pulse edges. In such an event, even when the periods of time between the edges depending upon their respective types are measured, there is no need of producing the results as being identifiable from one another, and hence, it is sufficient to sequentially issue the results without any particular discrimination from one another.

The velocity converting unit 6de uses a distance corresponding to an interval between the pulse edges and a measurement result of the period of time under the specified conditions of pulse edge detection to execute computation and conversion into the motor velocity.

Assuming that the measurement result of the period of time between the pulse edges by the timer counter 6dd, or a count value from the timer counter 6dd is T (T=T1, T2, . . . ) and that a distance between slits in the character board 12 of the encoder 11 is $\lambda$, since a distance corresponding to an interval between the pulse edges under the specified conditions of pulse edge detection is $\lambda$ when the conditions of pulse edge detection shown in FIGS. 12A and 12B are specified, an operation V=$\lambda$/T is sequentially carried out to obtain a converted value into a motor velocity V.

When the condition of pulse edge detection shown in FIG. 12C is specified, the distance corresponding to an interval between the pulse edges is $\lambda$/4, and therefore, by sequentially performing an operation V=$\lambda$/(4T), conversion into the motor velocity V is possible.

An exemplary configuration of the speed calculator 6d described above can have the pulse edge detector 6da, the timer counter 6dd, and the velocity converter 6de respectively comprised of CPU, have the detection condition setting unit 6db comprised of CPU, RAM, or ASIC, and have the detection condition memory 6dc comprised of PROM, EEPROM, or ASIC.

Figure 13:
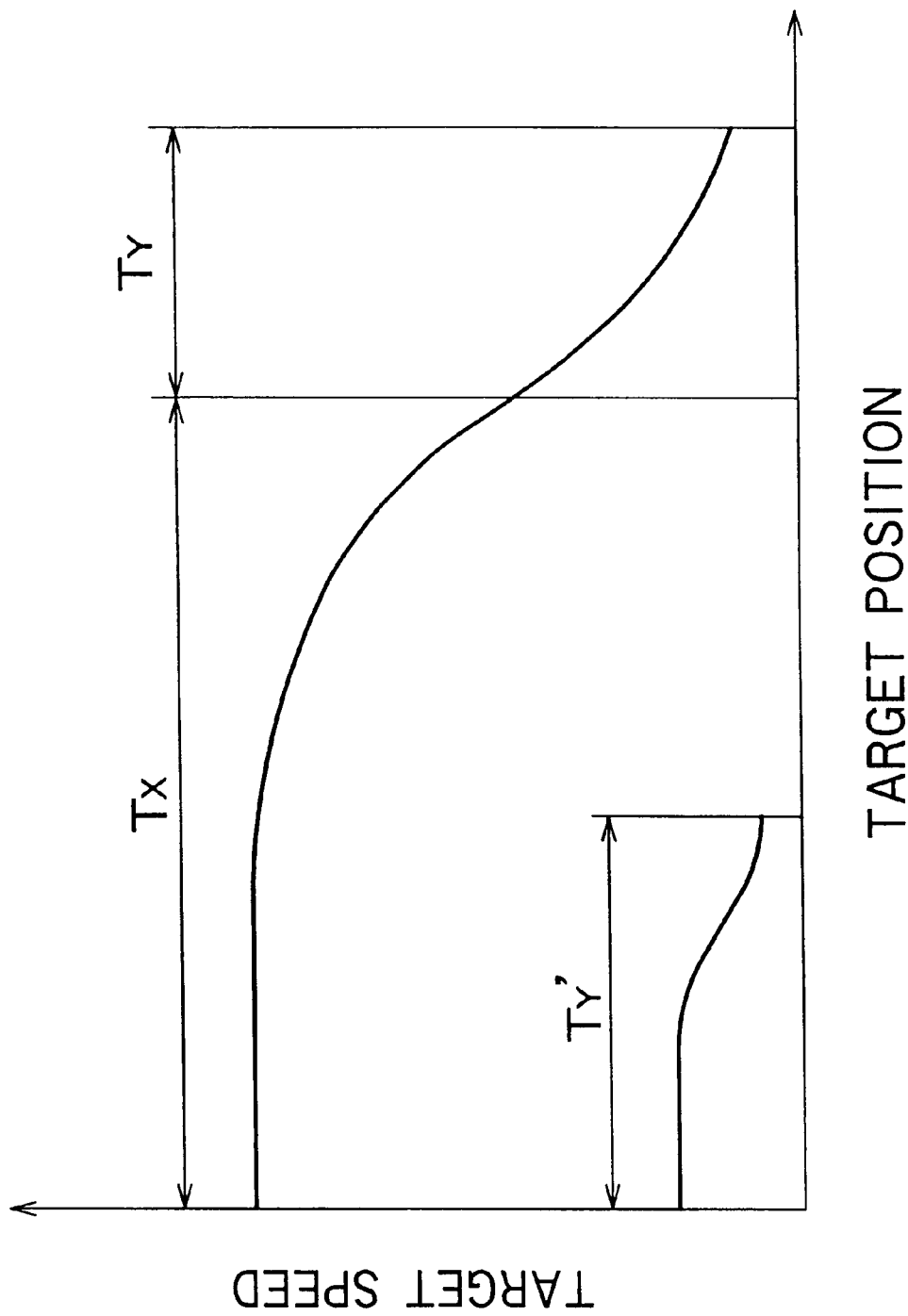
FIG. 13 is a graph showing a speed of switching settings on the conditions of pulse edge detection illustrated in FIGS. 12A and 12B.

FIG. 13 is a graph showing a speed of switching settings on the conditions of pulse edge detection shown in FIGS. 12A and 12B.

As can be seen in the graph in FIG. 13, during a period of time TX for which variations of a targeted velocity of the motor are relatively small and the targeted velocity of the motor has been sufficiently high, a sufficient resolution of detection of the motor velocity can be attained under the condition of pulse edge detection shown in FIG. 12B, as stated above, to ensure expansive operation ability of the speed calculator 6d. Thus, preferably, during the period of time TX, the condition of pulse edge detection shown in FIG. 12B may be specified.

The motor velocity must be detected with high accuracy during a period of time TY for which the variations of the targeted velocity of the motor are relatively great, the targeted velocity of the motor is relatively low, and the duty ratio of either of the encoder pulses and the phase difference between the encoder pulses are liable to vary, and therefore, it is preferable that the condition of pulse edge detection shown in FIG. 12A may be specified.

On the other hand, although variations of the targeted velocity of the motor is relatively small, the motor velocity must be detected with high accuracy during a period of time TY' for which the targeted velocity of the motor is low, and therefore, the condition of pulse edge detection shown in FIG. 12A may preferably be specified rather than that in FIG. 12B.

A higher targeted velocity of the motor tends to be usually employed for a longer displacement of the object to be driven by the motor, and hence, if a relation of the displacement to the targeted velocity is known in advance, control over the periods TX and TY may be predetermined depending upon the displacement, or control over the period TY' may be predetermined.

The switching of the settings on the conditions of pulse edge detection may be carried out, depending upon operation abilities of the CPUs which the pulse edge detector 6da, the timer counter 6dd, the velocity converting unit 6de, and the detection condition setting unit 6db are partially or totally comprised of, respectively. The pulse edge detector 6da for the encoder pulse edge detection may have a function of a filter.

Then, a control to decelerate and stop the motor in operation will now be described. Due to the control to stop the motor, electric power to the motor is disconnected before a target edge of the encoder pulse indicating a targeted stop position, so as to put the brake on the motor to stop it. A position at which the brake is to be put on the motor before the target edge depends upon braking properties observed from experiments and practical data obtained from the experiments.

Figure 14:
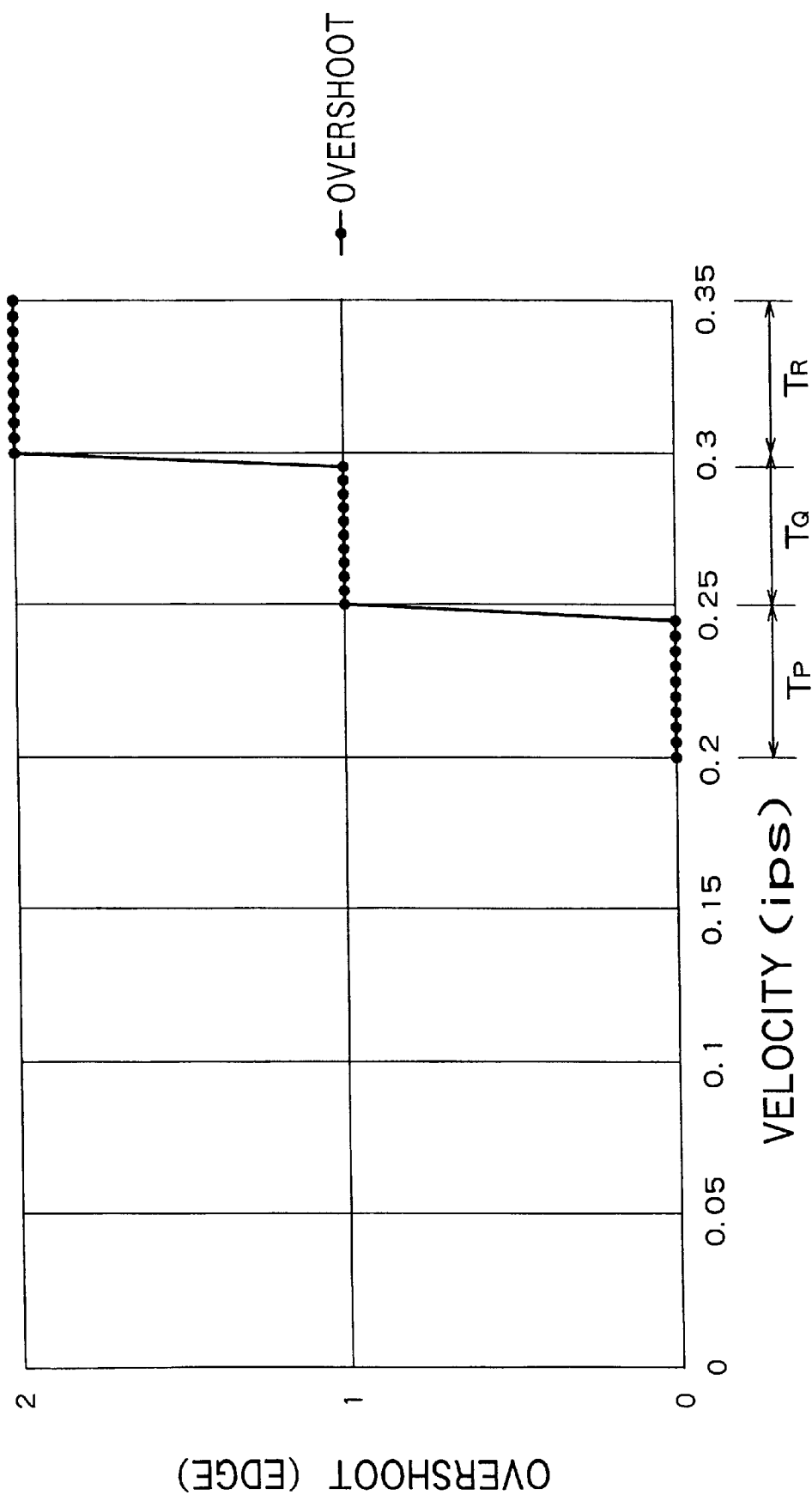
FIG. 14 is a graph showing an example of relations between a velocity and an overshoot during the braking.
Figure 15:
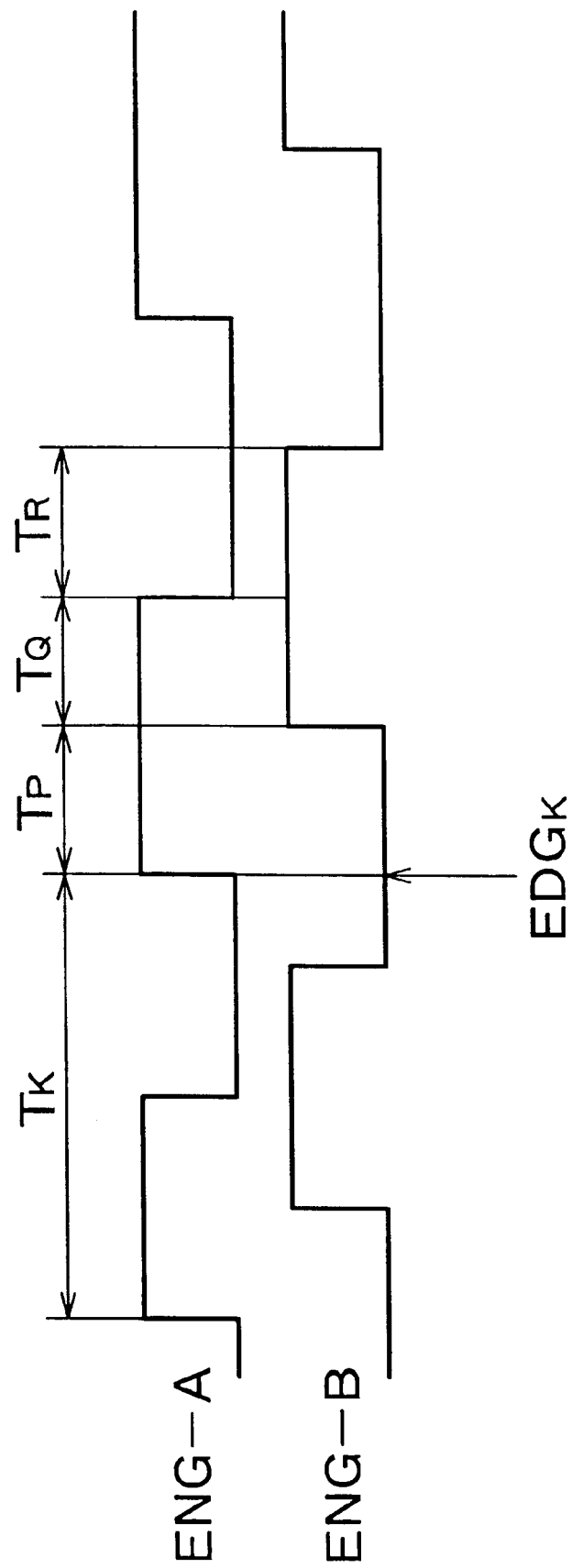
FIG. 15 is a timing chart showing a duration of velocity measurement, a timing of the braking, and an overshoot during the braking.

FIG. 14 is a graph showing an exemplary relation of a velocity (ips: inch per second) in the braking to an overshoot (of the edge) while FIG. 15 is a timing chart illustrating a duration for which the velocity is measured in the braking, braking timings, and the overshoot (of the edges), where periods of time TP, TQ, and TR in FIG. 14 are equivalent to those in FIG. 15.

FIG. 14 shows a relation of a velocity measured during the period of time TK in the timing chart in FIG. 15 to an overshoot upon running the brake at a pulse edge EDGK. As illustrated in the graph in FIG. 14, the motor stops within a targeted section corresponding to the period of time TP when the velocity during the period of time TK immediately before the braking is in a range of 0.2 ips to less than 0.25 ips. Moreover, as will be recognized, the motor overshoots by a distance corresponding to a single edge when the velocity is in a range of 0.25 ips to less than 0.3 ips while it overshoots by a distance corresponding to two edges when the velocity is in a range of 0.3 ips to less than 0.35 ips. Thus, as shown in FIGS. 14 and 15, the motor velocity during the period of time TK immediately before the braking is in a range of 0.2 ips to less than 0.25 ips, the motor stops within the target section corresponding to the duration TP although the motor overshoots by a distance corresponding to a single edge to stop within a section corresponding to the period of time TQ when the velocity is in a range of 0.25 ips to less than 0.3 ips, while it overshoots by a distance corresponding to two edges to stop within a section corresponding to the duration TR when the velocity is in a range of 0.3 ips to less than 0.35 ips.

An example of the motor stop control by referring to the experiment data on the braking properties will now be described.

Figure 16:
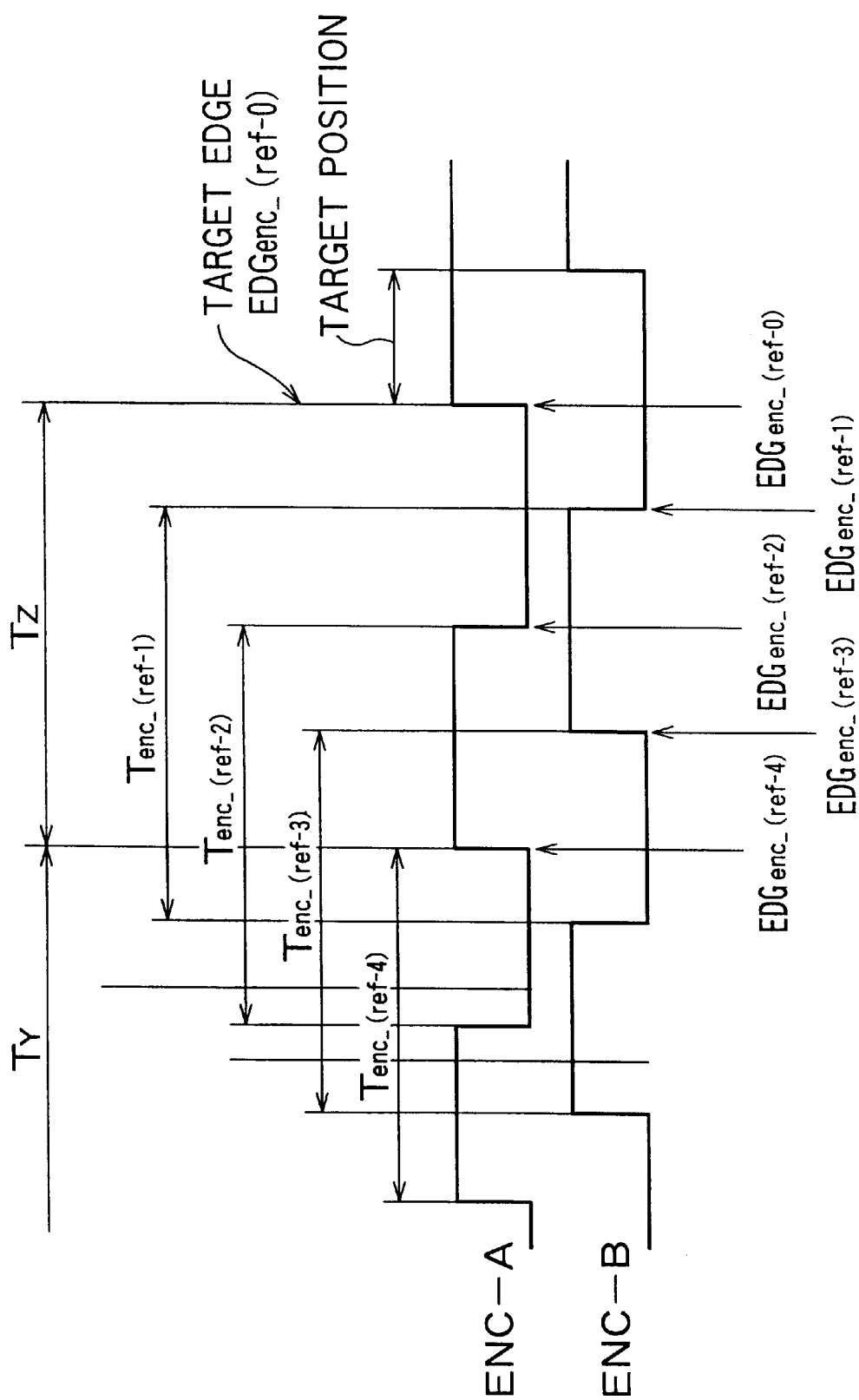
FIG. 16 is a timing chart showing an example of motor stop control.

FIG. 16 is a timing chart showing an example of the motor stop control, where a period of time TY is a duration of deceleration control, a period of time TZ is a duration of stop control, a pulse edge EDG(ref-0) is a target edge, and a section corresponding to a duration from the pulse EDG(ref-0) to a pulse edge right after it is a target stop position.

When the duration TZ of stop control is initiated, electric power to the motor is disconnected to determine whether the brake should be put on it, for each of the pulse edges. When the velocity is 0.3 ips or higher at the pulse edge EDG(ref-2), power supply to the motor is stopped at this point of time, but when the velocity is less than 0.3 ips, electric power is continuously supplied to the motor to continue the velocity control. When the motor velocity is 0.25 ips or higher at the pulse edge EDG(ref-1), power supply to the motor is stopped at this point of time, while when the velocity is less than 0.25 ips, electric power is continuously supplied to the motor to continue the velocity control. When power supply to the motor is not stopped at the pulse edge EDG(ref-0), power supply to the motor is stopped at the pulse edge EDG(ref-0) or the target edge to complete the motor stop control.

Although, in this example, the deceleration control for the duration TY aims at reducing the motor velocity down to less than 0.35 ips at a point of time of the pulse edge EDG(ref-4), a protective operation control is taken, when the motor velocity is 0.35 ips or higher at the time of the pulse edge EDG(ref3), so as to disconnect electric power to the motor at this point of time.

Such motor stop control is implemented, for example, by giving, to CPU, factors such as the targeted stop position, the detected velocity V received from the speed calculator 6*d*, and a comparison reference speed at each pulse edge for the duration TZ of stop control and then by transferring an output signal indicating the comparison result from the CPU to a D/A converter 6*j*. A comparison reference speed at each pulse edge for the duration TZ of stop control can be stored and retained in a device such as PROM, EEPROM, or ASIC.

In the above description, although the linear encoder 11 fixed to the carriage 3 is employed, a rotary encoder 13 for the PF motor 1 may be a substitution for it. Similarly, the motor in the above description may be the carriage motor 4 driving the carriage 3 or the paper feeding motor 1 used to feed paper sheets.

Figure 17:
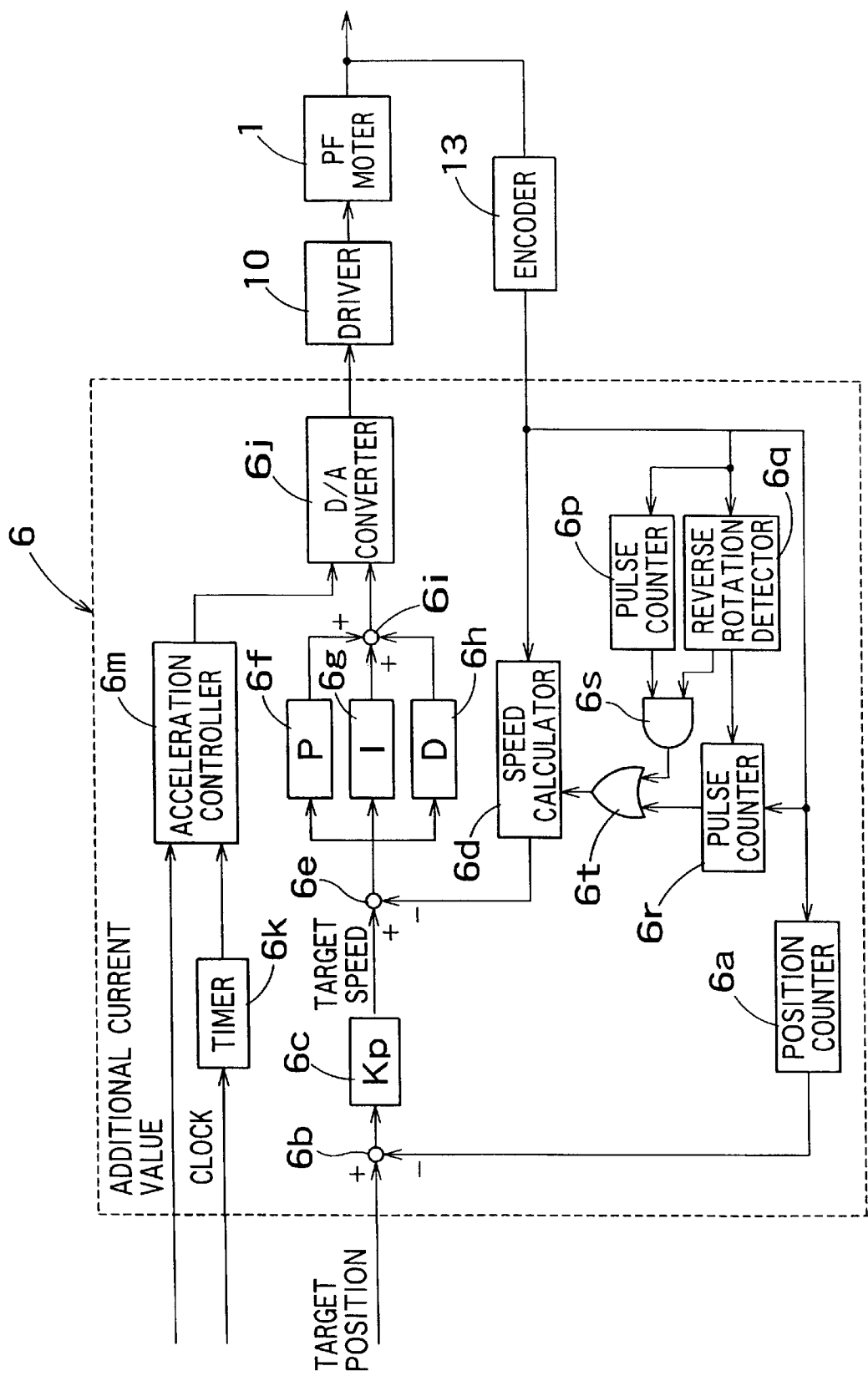
FIG. 17 is a block diagram showing a configuration of an embodiment of a motor control apparatus according to the invention.

Another embodiment of the motor control apparatus according to the invention will be described with reference to FIGS. 17 through 19. A configuration of the modified embodiment is shown in FIG. 17 while its operation is shown in a flow chart in FIG. 18. The embodiment of the motor control apparatus has additional components to the prior art motor control apparatus (DC unit) 6 in FIG. 7 such as pulse counters 6*p* and 6*r*, a reverse rotation detector 6*q*, an AND gate 6*s*, and an OR gate 6*t*.

Figure 7:
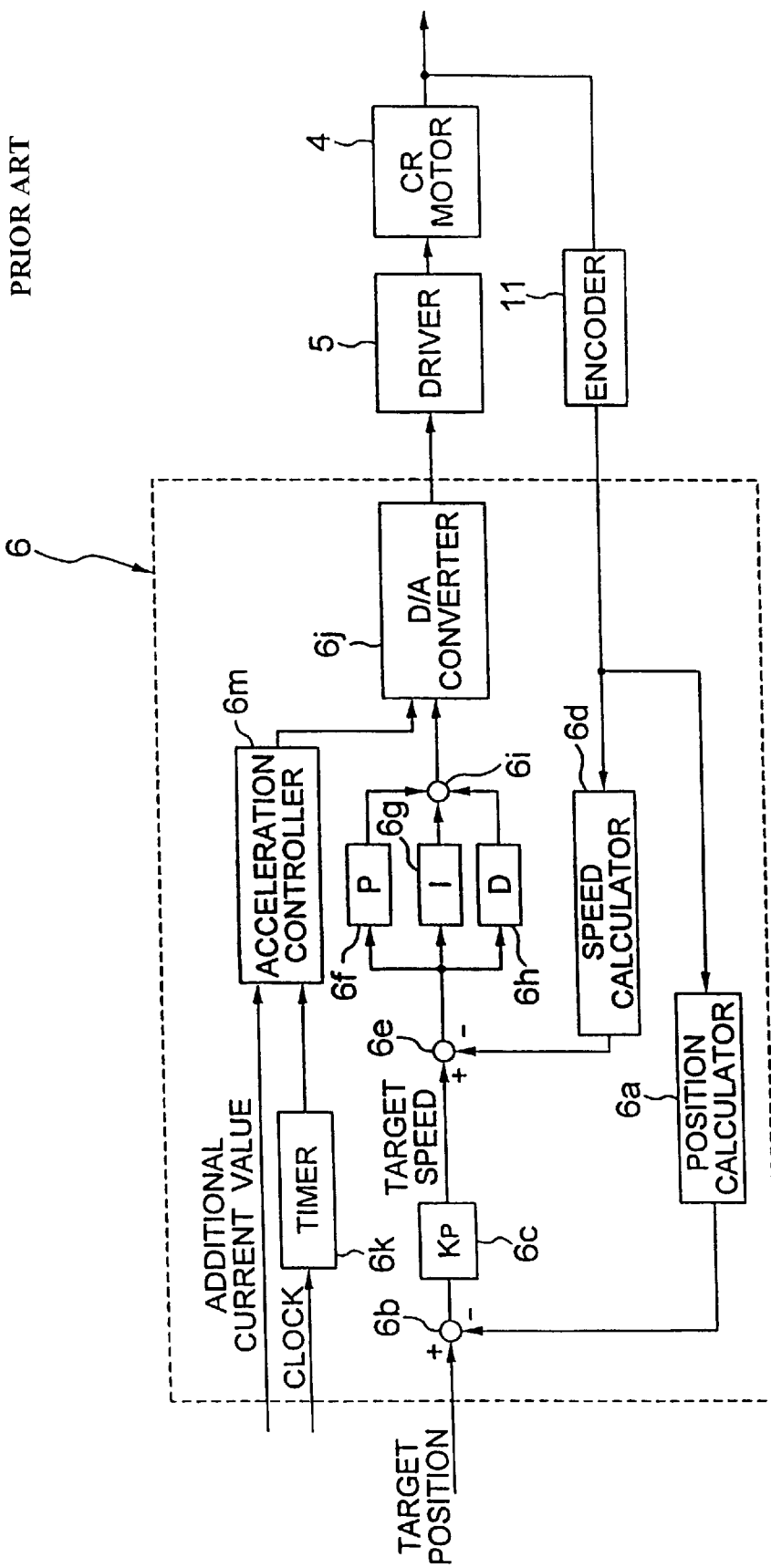
FIG. 7 is a block diagram showing a configuration of a DC unit 6 or a DC motor control apparatus.

Description of components other than the pulse counters 6*p* and 6*r*, the reverse rotation detector 6*q*, the AND gate 6*s*, and the OR gate 6*t* is omitted since like components have been described with reference to FIG. 7.

A configuration and function of the embodiment will be described below, referring to FIGS. 17 to 19.

Now assume that an actuation command signal has been given to the control apparatus 6, and the PF motor 1 has been actuated. When the PF motor 1 is actuated, the output pulses ENC-A and ENC-B are issued from the encoder 13. The number of leading and trailing edges of the output pulses ENC-A and ENC-B are counted by the pulse counter 6*p*. When a count value reaches a predetermined value $N_1$ (e.g., $N_1=7$), a command signal is transferred from the pulse counter 6*p* to the AND gate 6*s* (see step F1 in FIG. 18). At this time, the reverse rotation detector 6*q* detects whether an attachment unit (paper feeding roller 65) where the encoder 13 is attached is rotated in the reverse direction, by referring to output from the encoder 13 (see step F2 in FIG. 18). If it is determined that the attachment unit is not rotated in the reverse direction, a command signal is transferred from the reverse rotation detector 6*q* to the AND gate 6*s* to proceed to step F4 in FIG. 18 which will be mentioned hereinafter.

If it is determined that the attachment unit is rotated in the reverse direction, a command signal is transferred from the reverse rotation detector 6*q* to the pulse counter 6*r* when the attachment unit where the encoder 13 is attached turns to rotate from the reverse direction to the normal direction. When the command signal is received by the pulse counter 6*r*, the number of the edges of the output pulses ENC-A and ENC-B from the encoder 13 is counted after the reverse rotations of the attachment unit fixed to the encoder 13 turns to the normal rotations.

Figure 18:
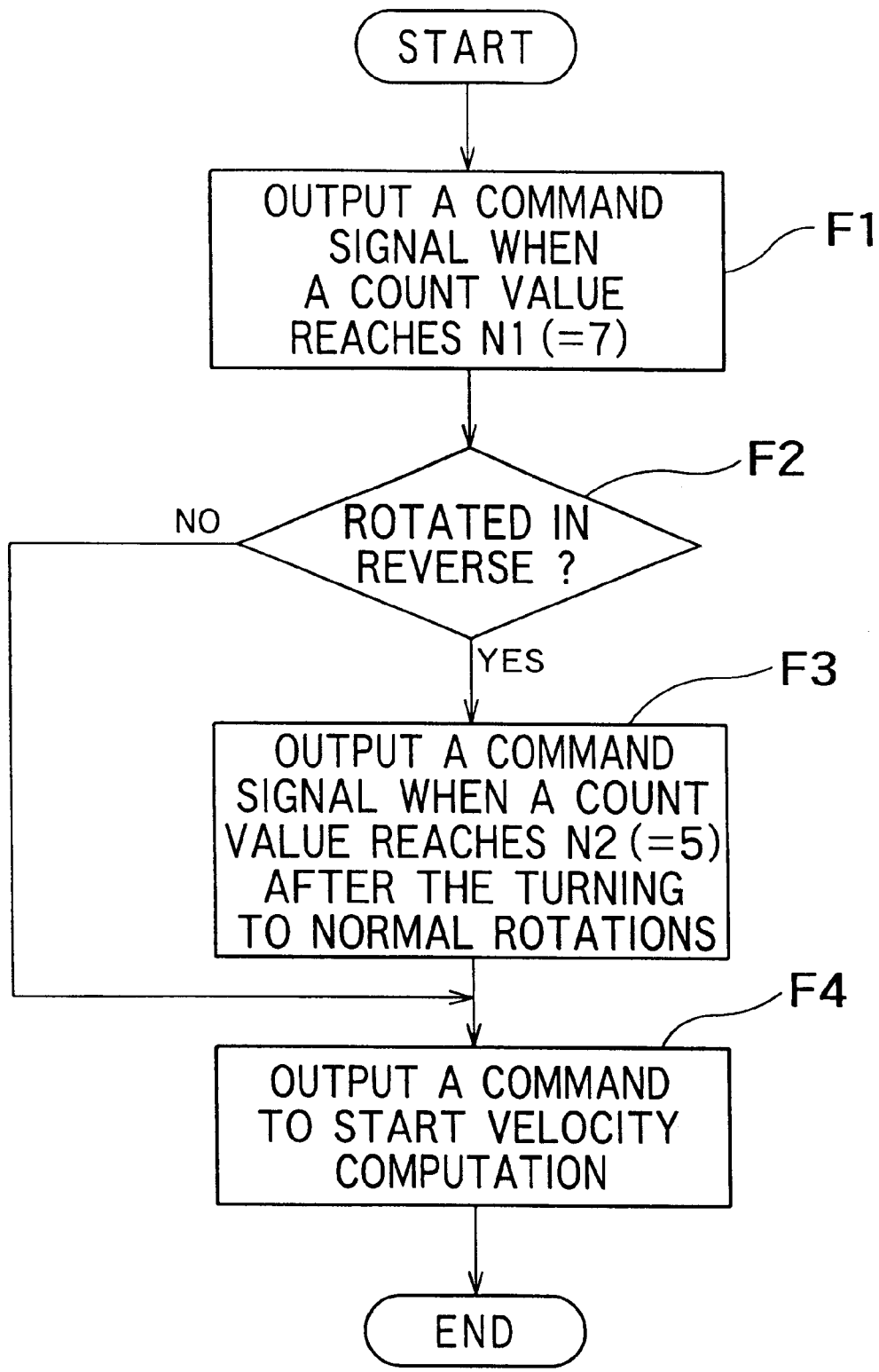
FIG. 18 is a flow chart illustrating a practical operation of the embodiment.
Figure 19:
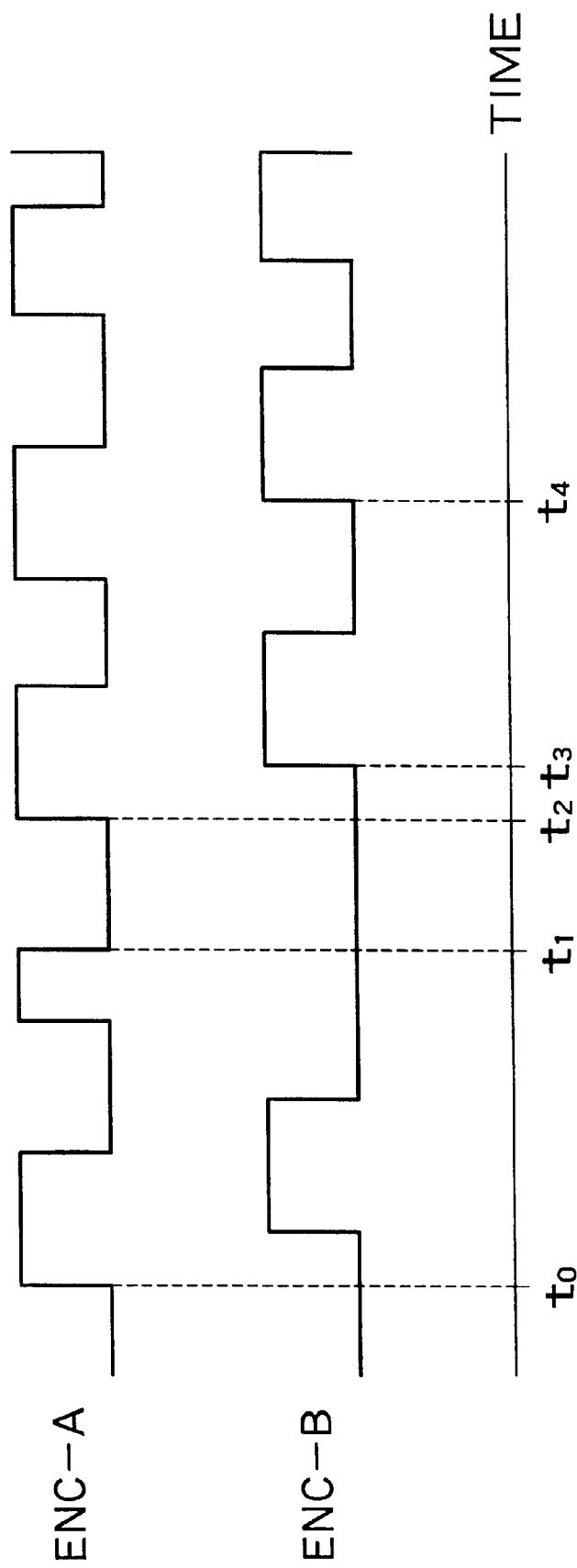
FIG. 19 is a timing chart showing an operation of a pulse counter.

When a count value $N_2$ reaches a predetermined value (e.g., $N_2=5$) or higher, a command signal is transferred from the pulse counter 6*r* to the OR gate 6*t* (see step F3 in FIG. 18). For instance, as shown in FIG. 19, after the PF motor 1 is actuated at time $t_0$ and rotated in reverse at $t_1$, the reverse rotation detector 6*q* detects normal rotations at time $t_2$, and in response to the detection, the command signal is transferred to the pulse counter 6*r*. Upon and after the incoming of a next pulse edge at time $t_3$, the pulse counter 6*r* counts the number of the pulse edges, and when the count value $N_2$ reaches 5 at time $t_4$, a command signal is transferred from the pulse counter 6*r* to the OR gate 6*t*.

When the attachment unit to the encoder 13 is not rotated in reverse, the command signals are transferred from the pulse counter 6*p* and the reverse rotation detector 6*q* to the AND gate 6*s*, respectively, and hence, a command signal is output to the OR gate 6*t* by the AND gate 6*s*.

Thus, the command signal is transferred to the OR gate 6*t* from the AND gate when it is determined that the attachment unit to the encoder 13 is not rotated in reverse, and it is from the pulse counter 6*r* when the attachment unit is rotated in reverse. Subsequently, a start command to start computing a velocity is sent to the speed calculator 6*d* by the OR gate 6*t* (see step F4 in FIG. 18).

The speed calculator 6*d* does not start computing the velocity as has been described with reference to FIG. 7 until it receives the start command.

In the embodiment according to the invention as has been described, when the attachment unit to the encoder 13 is rotated in reverse due to the actuation of the PF motor 1, the predetermined number $N_2$ of the pulse edges right after alteration from the reverse rotations to the normal rotations are not used for the velocity computation, but the succeeding pulse edges are used to compute the velocity. Thus, output from the speed calculator 6d is accurate even if the attachment unit to the encoder 13 is rotated in reverse when the PF motor 1 is actuated.

Since the predetermined number $N_2$ of the pulse edges right after alteration from the reverse rotations to the normal rotations are not used for the velocity computation, but the succeeding pulse edges are used to compute the velocity, the timer counter used in the speed calculator 6d for the velocity computation can be prevented from overflowing even if the attachment unit to the encoder 13 is rotated in reverse upon the actuation of the PF motor 1.

Although the DC motor is employed as the preferred embodiment in the above description, motors such as an AC motor should be used in some applications.

The predetermined number $N_2$ may be altered depending upon a frequency of use of the printer, environmental conditions, and so on.

As has been described, in accordance with the invention, the velocity can be detected accurately even when the attachment unit to the encoder is rotated in reverse upon the actuation of the motor.

Figure 20:
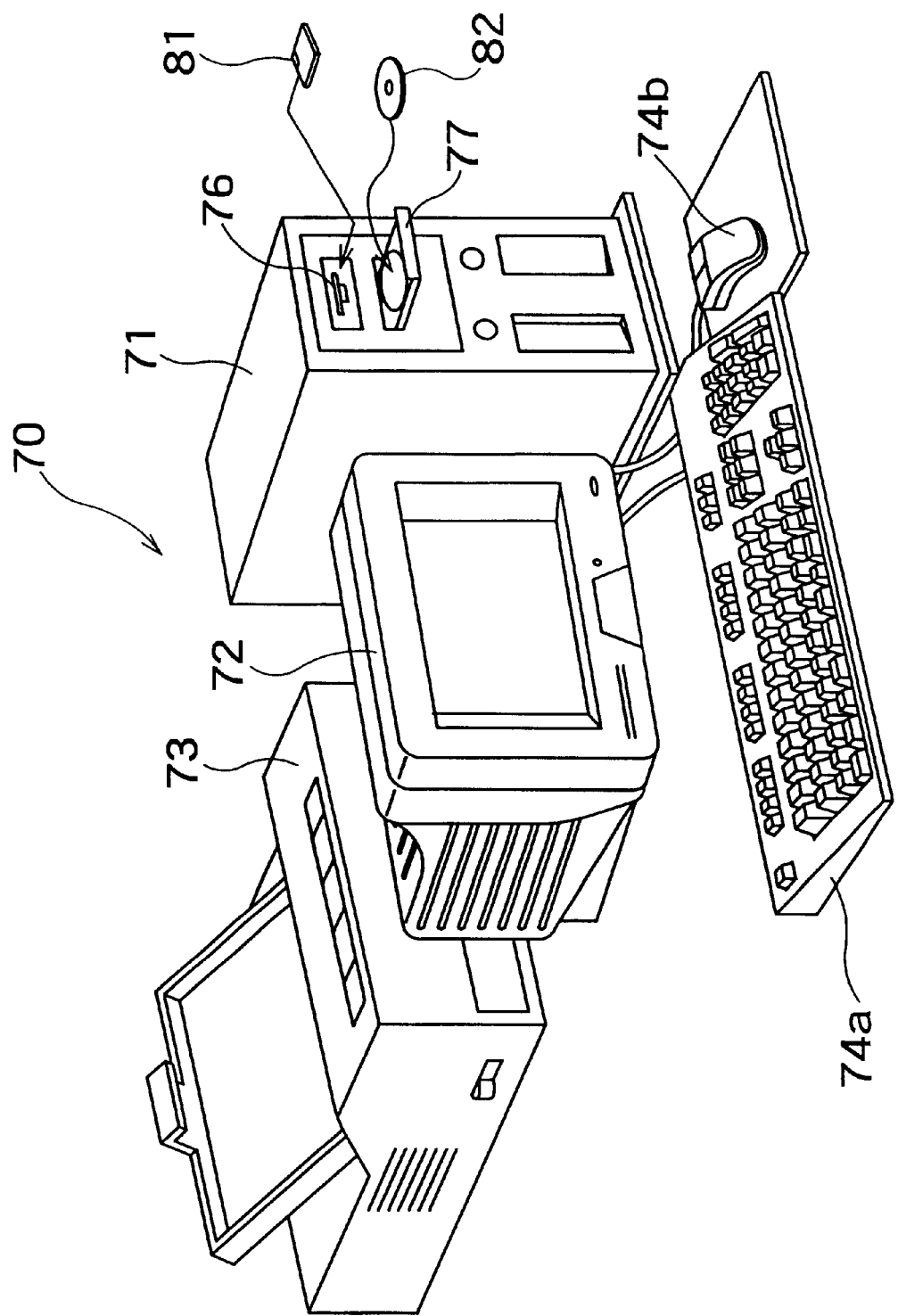
FIG. 20 is a illustrative view showing outer configurations of a record medium storing programs to execute a motor control method according to the invention and a computer system in which the record medium is used.
Figure 21:
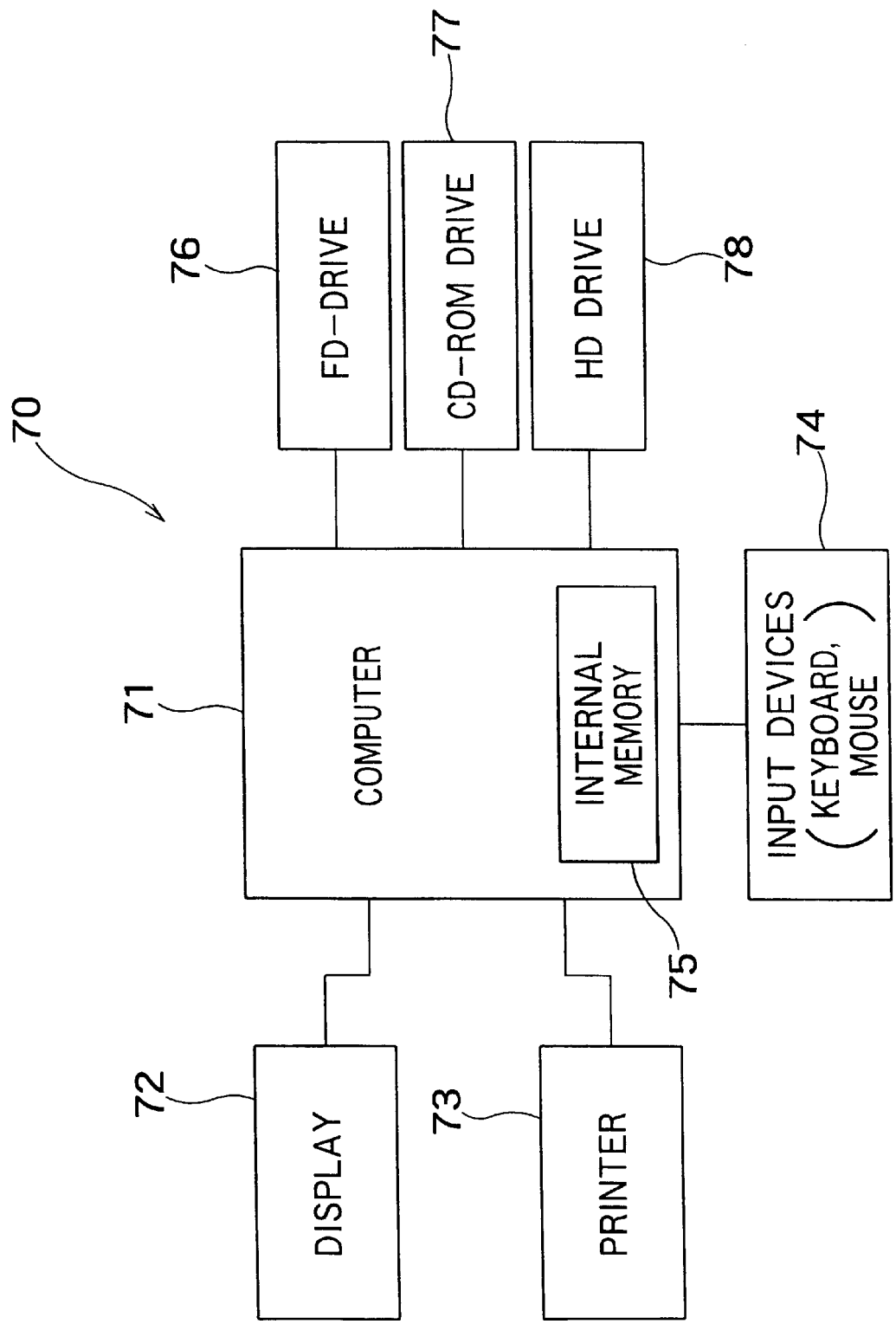
FIG. 21 is a block diagram showing a configuration of a computer system illustrated in FIG. 20.

FIG. 20 is a diagram showing external configurations of a record medium storing programs to execute the motor control method according to the invention and of a computer system in which the record medium is used while FIG. 21 is a block diagram showing an internal arrangement of the computer system illustrated in FIG. 20.

A computer system 70 shown in FIG. 20 is comprised of a computer main body 71 housed in a cabinet shaped in varieties such as in a mini-tower, a display 72 such as a CRT (cathode ray tube), a plasma display and a liquid crystal display, a printer 73 serving as a record producing device, a key board 74a and a mouse 74b serving as input devices, a flexible disk drive 76, and a CD-ROM drive 77. FIG. 21 is a block diagram showing the arrangement of the computer system 70, where internal memories 75 such as RAM (random access memory) and external memories 78 such as hard disk drive unit are further provided within the cabinet enclosing the computer main body 71. Record mediums storing computer programs to execute the motor control method according to the invention are used in the computer system 70. The record mediums include a flexible disk 81 and CD-ROM (read only memory), and in addition to that, MO (magnetic optical) disk, DVD (digital versatile disk), other types of optical recording disks, card memory, magnetic tape, etc. may be used.

What is claimed is:

1. A motor control apparatus for detecting a motor velocity, comprising:
   a signal generator producing a first pulse signal proportional in cycle to a motor velocity and a second pulse signal proportional in cycle to said motor velocity and different in phase from said first pulse signal is about one quarter of a single cycle;
   a pulse edge detector distinctively detecting leading edges and trailing edges of said first and second pulse signals from one another;
   a time counter measuring a period of time between the pulse edges in the same direction of the same pulse signal;
   a velocity converter using the period of time measured by said time counter to sequentially convert it into said motor velocity and thereby detect said motor velocity;
   a comparison reference value memory storing comparison reference values determined for each of the pulse edges, from the one preceding by a specific number of the pulse edges to a target edge which is a pulse edge indicating a targeted stop position of an object to be driven by said motor, to said target edge; and
   a motor stop controller comparing the comparison reference value with said motor velocity for each of the pulse edges from the pulse edge preceding by said specific number to said target edge so as to give a command to stop said motor when said motor velocity is equal to or over said comparison reference value.

2. The motor control apparatus according to claim 1, wherein said velocity converter performs the conversion into said motor speed by dividing a distance corresponding to an interval between said pulse edges by said period of time.

3. The motor control apparatus according to claim 1, wherein said comparison reference value memory is comprised of either one of PROM, EEPROM, and ASIC while said motor stop controller is comprised of a CPU.

4. The motor control apparatus according to claim 1, wherein said pulse edge detector, said time counter, and said velocity converter are comprised of a CPU.

5. The motor control apparatus according to claim 1, wherein said signal generator is comprised of an encoder.

6. The motor apparatus according to claim 5, wherein said encoder is a linear encoder fixed to a carriage of a serial printer.

7. The motor control apparatus according to claim 5, wherein said motor is a carriage motor actuating said carriage.

8. The motor control apparatus according to claim 5, wherein said encoder is a rotary encoder for a paper feeding motor in a serial printer.

9. The motor control apparatus according to claim 8, wherein said motor is a paper feeding motor which feeds paper in said serial printer.

10. A motor control apparatus for detecting a motor velocity, comprising:
    a signal generator producing a first pulse signal proportional in cycle to a motor velocity and a second pulse signal proportional in cycle to said motor velocity and different in phase from said first pulse signal by about one quarter of a single cycle;
    a detection condition memory storing a plurality of detection conditions including a condition of distinctively detecting pulse edges in the same direction of the same pulse signal, so as to issue either of said detection conditions depending upon a specified condition;
    a detection condition setting unit specifying said detection conditions received from said detection condition memory;
    a pulse edge detector detecting part or all of leading and trailing edges of said first and second pulse signals depending upon said detection conditions specified by said detection condition setting unit;
    a time counter measuring a period of time between the pulse edges detected by said pulse edge detector; and
    a velocity converter using the period of time measured by said time counter to sequentially convert it into said motor velocity and thereby detect said motor velocity,
    wherein said time counter can simultaneously measure at least four periods of time between the pulse edges in parallel with one another.

11. The motor control apparatus according to claim 10, wherein said specified condition includes said motor velocity, the number of cycles of said first or said second pulse signal, or a driving amount of said motor.

12. The motor control apparatus according to claim 10, wherein said time counter measures the periods of time between the pulse edges in the same direction of the same pulse signal when said pulse detector distinctively detects the pulse edges in the same direction of the same pulse signal.

13. The motor control apparatus according to claim 10, wherein said detection condition memory and said detection condition setting unit are respectively comprised of either one of PROM, EEPROM, and ASIC.

14. The motor control apparatus according to claim 10, wherein said velocity converter performs conversion to said motor velocity by dividing a distance corresponding to an interval between the pulse edges by said period of time.

15. The motor control apparatus according to claim 10, further comprising:
a comparison reference value memory storing comparison reference values determined for each of the pulse edges, from the one preceding by a specific number of pulse edges to a target edge which is a pulse edge indicating a targeted stop position of an object to be driven by said motor, to said target edge; and
a motor stop controller comparing said comparison reference value with said motor velocity for each of the pulse edges from the pulse edge preceding by said specific number to said target edge so as to give a command to stop said motor when said motor velocity is equal to or over said comparison reference value.

16. The motor control apparatus according to claim 15, wherein said comparison reference value memory is comprised of either one of PROM, EEPROM, and ASIC while said motor stop controller is comprised of a CPU.

17. The motor control apparatus according to claim 10, wherein said pulse edge detector, said time counter, and said velocity converter are comprised of a CPU.

18. The motor control apparatus according to claim 10, wherein said signal generator is comprised of an encoder.

19. The motor control apparatus according to claim 18, wherein said encoder is a linear encoder fixed to a carriage of a serial printer.

20. The motor control apparatus according to claim 19, wherein said motor is a carriage motor actuating said carriage.

21. The motor control apparatus according to claim 18, wherein said encoder is a rotary encoder for a paper feeding motor in a serial printer.

22. The motor control apparatus according to claim 21, wherein said motor is a paper feeding motor which feeds paper in said serial printer.

23. A motor control method for detecting a motor velocity, comprising:
a first step of generating a first pulse signal proportional in cycle to a motor velocity and a second pulse signal proportional in cycle to the motor velocity and different in phase from the first pulse signal by about one quarter of a single cycle;
a second step of distinctively detecting leading and trailing edges of said first and second pulse signals from one another;
a third step of measuring a period of time between the pulse edges in the same direction of the same pulse; and
a fourth step of using a measured result of the period of time to sequentially convert it into said motor velocity and thereby detect said motor velocity; and
a fifth step of comparing said motor velocity with comparison reference values for individual pulse edges from a pulse edge preceding by a predetermined number of pulse edges to a target edge which is a pulse edge indicating a target stop position of an object to be driven by said motor to said target edge, at respective said pulse edges, and issuing a command to stop the motor when said motor velocity is equal to or over said comparison reference values.

24. The motor control method according to claim 23, wherein said fourth step includes executing conversion of said motor velocity by dividing a distance corresponding to an interval between the pulses by said period of time.

25. A motor control method for detecting a motor velocity, comprising:
a first step of generating a first pulse signal proportional in cycle to a motor velocity and a second pulse signal proportional in cycle to the motor velocity and different in phase from said first pulse signal by about one quarter of a cycle;
a second step responsive to a specified condition to select one of a plurality of conditions of detection that include a condition of distinctively detecting the pulse edges in the same direction of the same pulse signal;
a third step depending upon the selected condition of detection to detect part or all of leading and trailing edges of the first and second pulse signals;
a fourth step of measuring a period of time between the detected pulse edges;
a fifth step of using a measured result of the period of time to sequentially convert it into said motor velocity and thereby detect said motor velocity; and
a sixth step of comparing said motor velocity with comparison reference values for individual pulse edges from a pulse edge preceding by a predetermined number of pulse edges to a target edge which is a pulse edge indicating a target stop position of an object to be driven by said motor to said target edge, at respective said pulse edges, and issuing a command to stop the motor when said motor velocity is equal to or over said comparison reference values.

26. The motor control method according to claim 25, wherein the specified condition includes said motor velocity, said number of cycles of said first or said second pulse signal, or a driving amount of said motor.

27. The motor control method according to claim 25, wherein, in distinctively detecting the pulse edges in the same direction of the same pulse signal in said third step, a period of time between the pulse edges in the same direction of the same pulse is measured in said fourth step.

28. The motor control method according to claim 25, wherein said fifth step executes the conversion into the motor velocity by dividing a distance corresponding to an interval between the pulse edges by the period of time.

29. A record medium storing computer programs to execute a motor control method for detecting a motor velocity in a computer system, said method comprising:
a first step of generating a first pulse signal proportional in cycle to a motor velocity and a second pulse signal proportional in cycle to the motor velocity and different in phase from the first pulse signal by about one quarter of a single cycle;
a second step of distinctively detecting leading and trailing edges of the first and second pulse signals from one another;
a third step of measuring a period of time between the pulse edges in the same direction of the same pulse;
a fourth step of using a measured result of the period of time to sequentially convert it into said motor velocity and thereby detect said motor velocity; and
a fifth step of comparing said motor velocity with comparison reference values for individual pulse edges from a pulse edge preceding by a predetermined number of pulse edges to a target edge which is a pulse edge indicating a target stop position of an object to be driven by said motor to said target edge, at respective said pulse edges, and issuing a command to stop the motor when said motor velocity is equal to or over said comparison reference values.

30. A record medium storing computer programs to execute a motor control method for detecting a motor velocity in a computer system, said method comprising:

a first step of generating a first pulse signal proportional in cycle to a motor velocity and a second pulse signal proportional in cycle to the motor velocity and different in phase from the first pulse signal by about one quarter of a cycle;

a second step responsive to a specified condition to select one of a plurality of conditions of detection that include a condition of distinctively detecting the pulse edges in the same direction of the same pulse signal;

a third step depending upon the selected condition of detection to detect part or all of leading and trailing edges of the first and second pulse signals;

a fourth step of measuring a period of time between the detected pulse edges;

a fifth step of using a measured result of the period of time to sequentially convert it into said motor velocity and thereby detect said motor velocity; and a sixth step of comparing said motor velocity with comparison reference values for individual pulse edges from a pulse edge preceding by a predetermined number of pulse edges to a target edge which is a pulse edge indicating a target stop position of an object to be driven by said motor to said target edge, at respective said pulse edges, and issuing a command to stop the motor when said motor velocity is equal to or over said comparison reference values.

31. A motor control apparatus, comprising:

a reverse rotation detector for detecting if, upon actuation by the motor, reverse rotations are caused in an attachment unit where an encoder is attached, from output pulses from the encoder rotated by rotations of the motor;

a first pulse counter counting edges of the output pulses from the encoder after the attachment unit has rotated from a reverse direction to a normal direction when the reverse rotations are caused in the attachment unit, to give a start command when a count value reaches a first specified value;

a speed calculator receiving the start command when the reverse rotations are caused in the attachment unit, to compute the motor velocity from the output pulses from the encoder; and a second pulse counter which, upon actuation by the motor, counts the edges of the output pulses from the encoder to give a start command when a count value reaches a second specified value, said speed calculator being configured to receive the start command output from the first pulse counter when the reverse rotations are caused in the attachment unit, or receive the start command output from the second pulse counter when the reverse rotations are not caused in the attachment unit, to start computation of the velocity.

32. The motor control apparatus according to claim 31, wherein the motor is a paper feeding motor in a printer.

33. The motor control apparatus according to claim 31, further comprising a speed controller controlling the motor velocity by referring to a difference between a targeted velocity of the motor and the motor velocity obtained through the computation by the speed calculator.

34. A motor control method, comprising:

a step of referring to output pulses from an encoder rotated by rotations of a motor to detect, upon actuation by the motor, whether reverse rotations are caused in an attachment unit where the encoder is attached;

a step of counting edges of the output pulses from the encoder after the attachment unit has turned to rotate from a reverse direction to a normal direction when reverse rotations are caused in the attachment unit, to issue a start command when a count value reaches a first specified value;

a step of computing the motor velocity from the output pulses from the encoder when the start command is received; and a step of counting edges of the output pulses from the encoder prior to the step of computing the motor velocity, to issue a start command when a count value reaches a second specified value or when reverse rotations are not caused in the attachment unit.

35. The motor control method according to claim 34, further comprising a step of referring to a difference between a targeted velocity of the motor and the computed velocity after the step of computing the motor velocity, to control the motor velocity.

36. The motor control method according to claim 34, wherein said motor is a paper feeding motor in a printer.

37. A record medium storing a control program to control a motor by means of a computer, said program comprising:

a procedure of referring to output pulses from an encoder rotated by rotations of a motor to detect, upon actuation by the motor, if reverse rotations are caused in an attachment unit where the encoder is attached;

a procedure of counting edges of the output pulses from the encoder after the attachment unit has turned to rotate from a reverse direction to a normal direction when reverse rotations are caused in the attachment unit, to issue a start command when a count value reaches a first specified value;

a procedure of counting edges of the output pulses from the encoder to issue a start command when a count value reaches a second specified value or when reverse rotations are not caused in the attachment unit; and a procedure of computing the motor velocity from the output pulses from the encoder when the start command is received.

38. A motor control apparatus for detecting a motor velocity, comprising:

a comparison reference value memory storing comparison reference values determined for each of pulse edges, from the one preceding by a specific number of the pulse edges to a target edge which is a pulse edge indicating a targeted stop position of an object to be driven by a motor, to said target edge; and a motor stop controller comparing the comparison reference value with the motor velocity for each of the pulse edges from the pulse edge preceding by said specific number to said target edge so as to give a command to stop said motor when said motor velocity is equal to or over said comparison reference value.

* * * * *